(12) United States Patent
Wu et al.

(10) Patent No.: US 10,185,980 B1
(45) Date of Patent: Jan. 22, 2019

(54) EFFICIENTLY COMPUTING A FEATURE BASED ON A PLURALITY OF VARIABLES

(71) Applicant: Amazon Technologies, Inc., Seattle, WA (US)

(72) Inventors: Jingchen Wu, Seattle, WA (US); Zhihao Cen, Bellevue, WA (US); Jingqiao Zhang, Redmond, WA (US); Jeffrey B. Maurer, Port Orchard, WA (US); Deepak Bhatia, Issaquah, WA (US); Ali Sadighian, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 883 days.

(21) Appl. No.: 14/703,751

(22) Filed: May 4, 2015

(51) Int. Cl.
*G06Q 30/06* (2012.01)
*G06Q 10/08* (2012.01)

(52) U.S. Cl.
CPC ....... *G06Q 30/0605* (2013.01); *G06Q 10/087* (2013.01)

(58) Field of Classification Search
None
See application file for complete search history.

(56) References Cited

U.S. PATENT DOCUMENTS

| 7,249,068 | B1* | 7/2007 | Kakouros | G06Q 10/087 705/26.1 |
| 7,319,976 | B1* | 1/2008 | Peckover | G06Q 30/02 705/14.36 |
| 7,921,030 | B1* | 4/2011 | Verma | G06Q 10/04 705/1.1 |
| 8,781,882 | B1* | 7/2014 | Arboletti | G06Q 10/0639 705/7.11 |
| 2009/0292595 | A1* | 11/2009 | Tonnison | G06Q 30/02 705/14.1 |
| 2014/0156392 | A1* | 6/2014 | Ouimet | G06Q 30/0633 705/14.49 |

\* cited by examiner

*Primary Examiner* — Thomas L Mansfield
(74) *Attorney, Agent, or Firm* — Kilpatrick Townsend & Stockton LLP

(57) ABSTRACT

Techniques for computing a feature based on variables may be provided. For example, historical realizations associated with a first variable may be accessed. The first variable may be associated with an item. Realizations of the first variable may be based on one or more factors associated with the item. Historical realization of a second variable associated with the item may also be accessed. The historical realizations of the first and second variables may be analyzed to generate an expected realization of the first variable as a function of the second variable. The feature may be computed based on the generated function.

20 Claims, 10 Drawing Sheets

EFFICIENTLY COMPUTING A FEATURE BASED ON A PLURALITY OF VARIABLES

BACKGROUND

More and more users are turning to network-based resources, such as electronic marketplaces, to purchase items (e.g., goods and/or services). A network-based resource may provide a user experience unmatched by a more traditional brick and mortar store. For example, the network-based resource may offer a larger and more diverse selection of items. Further, for some of the items, there may be a number of sellers with different offers. As such, a customer may not only have access to a rich item selection, but may also obtain items at the most convenient offers.

Typically, a service provider of a network-based resource may coordinate with multiple entities to offer items. For example, the service provider may communicate with sellers to list the items at the network-based resource and with inventory planners to acquire and store a certain number of the items in storage. To efficiently and properly coordinate with the entities, the service provider may analyze data from different sources. The analysis may result in an inventory plan. However, the analysis may be computationally intensive and challenging in certain situations depending on, for example, the amount and type of data being computed and/or desired analysis accuracy.

BRIEF DESCRIPTION OF THE DRAWINGS

Various embodiments in accordance with the present disclosure will be described with reference to the drawings, in which.

DETAILED DESCRIPTION

Figure 1:
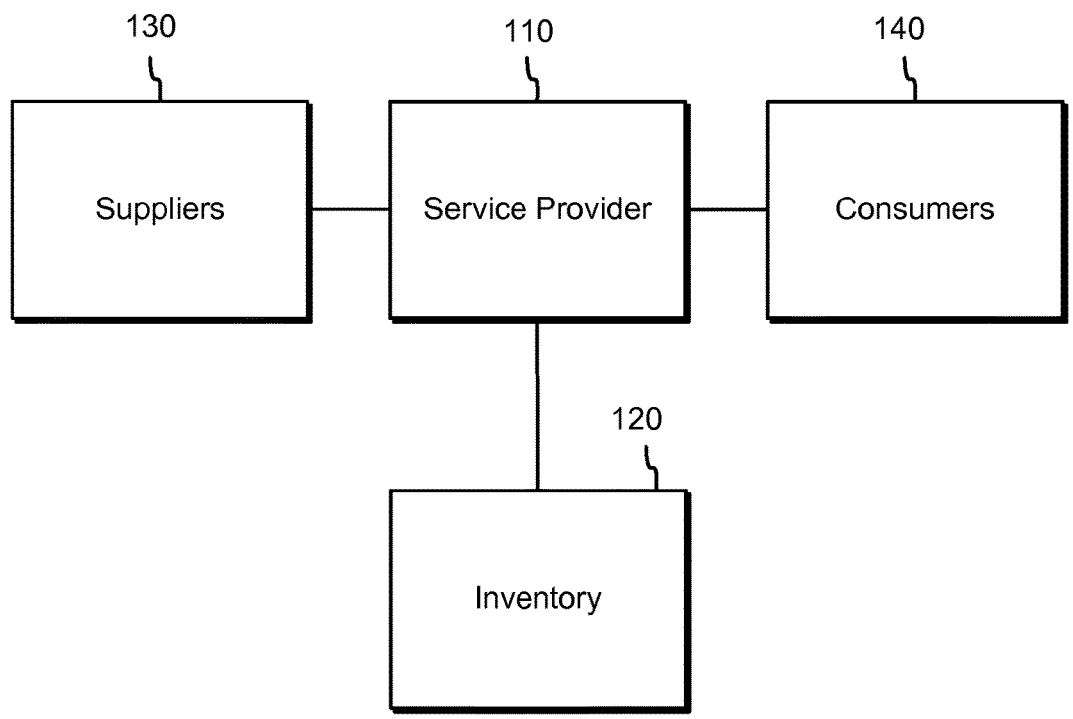
FIG. 1 is a block diagram illustrating an example environment for offering items at a network-based resource, according to embodiments.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments of the present disclosure are directed to, among other things, efficiently analyzing variables to enhance item inventory planning. Typically, a service provider that provides a network-based resource, such as a website for accessing an electronic marketplace, may operate various computing devices and associated services to offer items at the network-based resource. Some of the items may be obtained from sellers and/or other entities, stored as inventory, and offered to customers as in-stock items. A customer may be enticed to purchase an in-stock item because of, for example, a shorter delivery flow. However, the supply and demand can be stochastic. In certain situations, predicting what the sellers can supply or what the customers may request can be challenging. Thus, when making an inventory decision, a large number of variables, many or all of which may be random, may need to be analyzed.

To help with the inventory planning, the service provider may use an inventory management system. That system may implement and/or interface with a number of modules including, for example, a quantity computing module. For various items and over a planning horizon (e.g. a recurring weekly horizon), the quantity computing module may compute a quantity for each item for inventorying purposes. The inventory management system may use the computed quantities to generate a plan to acquire, process, and stock the items. To compute a quantity for an item, the quantity computing module may implement a model configured to search for an optimum quantity. The model may use an objective function that may analyze a number of features, variables, and constraints to find the optimum quantity. The optimization may include, for example, finding the quantity for which a particular feature (e.g. profit) may be maximized given a number of variables (e.g., price, demand, cost, and other item and/or inventory-related variables) and given a number of constraints (e.g., capacity constraints of providers or of an inventory facility, and other item and/or inventory-related constraints).

However, finding the optimum quantity may be computationally intensive or potentially infeasible in certain situations. For example, given the number of variables and the amount of data that should be analyzed, solving the objective function may use large amounts of processing power (e.g., a large number of underlying processors) and memory space. When the computation becomes infeasible, some approaches may reduce the number of variables and/or the amount of data. However, these approaches may result in a sub-optimal or even inaccurate quantity.

Thus, embodiments described herein are associated with balancing computing resource usage and quantity optimization. In an embodiment, one or more variables may be expressed as functions of one or more other variables. By using such expressions, the complexity of the computation may be reduced while still observing an acceptable accuracy of the optimization. To do so, the computing quantity model may access and analyze historical realizations of the variables. A realization may represent a set of observed or actual values. For example, a realization of a price variable for an item may represent the actual prices at which the item may have been sold. Based on the analysis, the computing module may estimate correlations between different variables. These correlations may enable expressing one or more variables as functions of one or more other variables. The computing quantity module may use the expressions in the model thereby reducing or simplifying the objective function. By doing so, the computing quantity module may find the optimum quantity while, nonetheless, accounting for the different variables.

To illustrate, consider an example where the goal is to find a quantity that maximizes a profit associated with offering an item at an electronic marketplace. A price variable may represent a random variable, the variability of which may be affected by a number of influencing factors associated with the item and/or provider(s) thereof. These factors may also represent variables and may include, for example, price matching related to offers from other network-based resources, promotions, markdowns, and/or vendor-associated list prices or list price changes. By considering the price variable as well as some demand variables, the objective function may involve at least two random variables. Seeking the optimal solution of this objective function may be computationally intensive. For example, finding the optimal solution may entail using a large amount of computing resources to estimate potential realizations (e.g., distributions) of both variables and using the estimations in the objective function. If these estimations are not available or if existing computing resources are insufficient, finding the quantity may not be possible. In such a situation, other approaches may set the price variable as a constant to transform the objective function into one with fewer random variables. However, these approaches may result in less optimum quantities by ignoring, for example, the influencing factors affecting the price variability. A less optimum quantity may translate into a sub-optimum inventory plan and, accordingly, may result in losses. Further, if the influencing factors were to be considered as variables in the objective function, the complexity of finding the optimum quantity may increase drastically.

Instead, embodiments described herein may not set the price variable to a constant. Rather, historical price realizations of the price variable and historical demand realizations of the demand variable may be accessed and analyzed to derive a correlation between the price variable and the demand variable. The correlation may be used to generate an expected realization of the price variable as a function of the demand variable. The expected realization of the price variable may be used in lieu of the price variable in the objective function. Because the expected realization may be a function of the demand variable, the objective function may then be transformed into a function with at least one fewer dimension of randomness. In other words, the expected realization of the price variable as a function of the demand variable may be used as a proxy to the price variable and to the influencing factors in the objective function. The transformation to an objective function with fewer random variables may result in a lower computing resource usage and yet a similarly accurate or optimum quantity.

In an illustrative use case, assume that the demand variable for an item may occupy two values: one hundred and two hundred units. Further, assume that the probability distribution of the demand variable may be 0.7 for one hundred units and 0.3 otherwise. Thus, the distribution of the demand variable may be expressed as DDF: $\{(d_1,p_1);(d_2,p_2)\}$, where "DDF" represents the demand distribution function, "$d_i$" represents one of the two demand values, and "$p_i$" represents the respective probability. In an example, a probability mass function (PMF) may be used instead of or additionally to the DDF. In addition, assume a constant cost "c" of $2 per unit. Based on an analysis of historical realizations, the price variable may be found to be $10 for a demand of one hundred units and $5 for a demand of two hundred units. The expected realization of the price variable may be expressed as E: $\{(price_1|d_1); (price_2|d_2)\}$, where "E" represents the expected realization and where "$price_i|d_i$," represents one of the two price values given the respective demand "$d_i$." This expected realization of the price variable may reflect the scenario of a lower price associated with a higher demand. To compute the optimum quantity, the expected realization and the demand variable may be used. For example, an objective function maximizing a profit "Profit" may solve Max(Profit|$q_i$), where "Profit|$q_i$" represents the profit given a quantity "$q_i$." The optimum quantity "$q_{optm}$" may correspond to the quantity "$q_i$" that may result in the maximum profit "Profit." To find this optimum quantity "$q_{optm}$," the quantity "$q_i$" may be varied based on the demand variable and the respective profit may be calculated based on the expected realization "E" and the demand distribution function "DDF." Thus the objective function may search for the optimum quantity that may maximize the profit Max(Profit|$q_i$): Max$\{(E,DDF)|q_i=d_i\}$.

In the illustrative use case, for $q_1$=100, the profit would be equal to 0.7×[(100×$10)−(100×$2)]+0.3×[(100×$5)−(100×$2)]=$650. Similarly, for $q_2$=200, the profit would be equal to 0.7×[(100×$10)−(200×$2)]+0.3×[(200×$5)−(200×$2)]=$600. Thus, the optimum quantity "$q_{optm}$" may be set to one hundred because this quantity may result in a higher profit. It may be important to note that in this illustrative use case, a lower quantity (one hundred versus two hundred) may result in a higher profit and may be used as the optimum quantity. That may be because the price variability may have been accounted for in the analysis. In comparison, if the price variable was set to a fixed constant (e.g., $10), the optimum quantity may have been found to be the higher quantity (e.g., two hundred). However, this result may be inaccurate (e.g., the higher quantity may actually result in a lower profit). This inaccuracy may stem from ignoring the price variability in the analysis.

In the interest of clarity of explanation, the embodiments described herein illustrate usages of two types of variables: a price variable and a demand variable. However, the embodiments are not limited as such. Instead, the embodiments may similarly apply to any other types and/or a larger number of variables. In particular, by analyzing historical realizations of different variables, correlations between the variables may be established. Based on these correlations, one or more variables may be expressed as functions of one or more other variables. These functions may include, for example, expected realizations of the one or more variables given the one or more other variables. The one or more other variables, along with the expected realizations, may be used in an objective function, thereby reducing the complexity of finding an optimum solution.

The reduction in complexity may translate into a more efficient usage of computing resources by, for example, reducing the amount of needed processing power and memory space. Further, the reduction in complexity may not be at the detriment of the accuracy of finding the optimum solution. Thus, a quantity computing module implementing the embodied techniques may more efficiently (e.g., computational efficiency) and accurately (e.g., accurate optimization) determine an optimum quantity. In turn, an inventory management system integrating, interfacing with, or subscribing to such a quantity computing module may be improved with respect to generating an inventory plan based on the optimum quantity.

Turning to FIG. 1, the figure illustrates an example environment configured to implement the above-described inventory management system and quantity computing module to support offering inventoried and non-inventoried items. More particularly, the illustrated environment includes a service provider 110 having access to an inventory 120 of items. The service provider 110 may obtain some of the items from suppliers 130 or from other sources. The service provider 110 may store the obtained items in the inventory 120 until ordered by customers 140. The customers 140 may include recipients or end-users of the items. However, not all of the items may be inventoried. Instead, the service provider 110 may facilitate a service for the customers 140 to obtain items directly from the suppliers 130 or from other sources.

In an embodiment, the service provider 110 may operate a network-based resource, such as electronic marketplace, to provide various types of services. Generally, the network-based resource may provide network pages or documents associated with and/or describing the items offered through the marketplace ("item pages" or "item detail pages"). An item page may include information about an item, such as descriptions of the item, related offers, identifiers of suppliers of the item, and other information. Among this information, the item page may display an in-stock attribute for the item. An in-stock attribute may represent an indication that the item may be or is about to be available in the inventory 120. In comparison, if the item is not available, the item page may display an out-of-stock attribute.

The suppliers 130 may operate computing devices to access the network-based resource over a network. A supplier may represent a seller, reseller, retailer, merchant, manufacturer, vendor, and/or another entity involved in providing items. The access of a supplier may enable various types of supplier-related transactions, such as offering items, updating offers of items, and/or canceling offers. In an example, the suppliers 130 and/or the service provider 110 may also use the network-based resource to offer price matching, promotions, markdowns, and/or vendor-associated list prices (e.g., changes to offered prices) for particular items.

Similarly, the customers 140 may operate computing devices to also access the network-based resource over a network. A customer may represent an end user, a consumer, a recipient of the item, and/or a potential recipient or user associated with obtaining the item. The access of a customer may enable various customer-related transactions, such as browsing, searching, purchasing, returning, and/or reviewing items. In particular, a customer may access an item page associated with an item, review the information about the item, and make a purchasing decision. As part of the purchase decision, the customer may consider the in-stock attribute. For example, the customer may be enticed to purchase the in-stock item over an out-of-stock item because of the potentially shorter delivery time.

In an embodiment, the inventory 120 may represent a warehouse, a fulfillment center, a data center, a content distribution center, or some other storage resource for storing items. Typically, an inventory management system may control operations of the inventory 120. An example inventory management system is further described in FIG. 2. In an example, the service provider 110 and/or other users may operate the inventory management system. For instance, various entities or organizations represented by the service provider 110 may provide input to and receive output from the inventory management system. In general, inputs and outputs of a user may include data related to inventoried items, such as how many units of an item may have been inventoried, how many of the units may have been sold, sale prices, an amount of demand for an item (e.g., the number of requests for information about the item or the number of actual sold units), variations in prices over time, variations in demand over time, and/or other inventory-related data.

To illustrate, a manager of a particular item category (e.g., televisions) may use the inventory management system to search and find the number of inventoried items of that category and to input data related to how many items may have been sold, the sale prices, and/or capacity to store additional items in the inventory 120. In another example, the suppliers 130 and/or third parties may additionally or alternatively operate the inventory management system. For instance, the suppliers 130 may input information in the inventory management system describing the various available items, associated prices, lead times, capacity to provide the items, and other supplier related information.

As such, the inventory management system may facilitate the management of the inventory 120. Further, inventory-related data generated as part of this management or in association with inputs and outputs of the different users may be accessed by a quantity computing module. The quantity computing module may be configured to analyze the data and, accordingly, compute quantities of items to be inventoried during a planning horizon. In turn, the inventory management system may use these quantities to generate an inventory plan. This plan may include, for example, purchase orders, storage accommodations, and/or other inventory-related planning based on the quantities.

Figure 2:
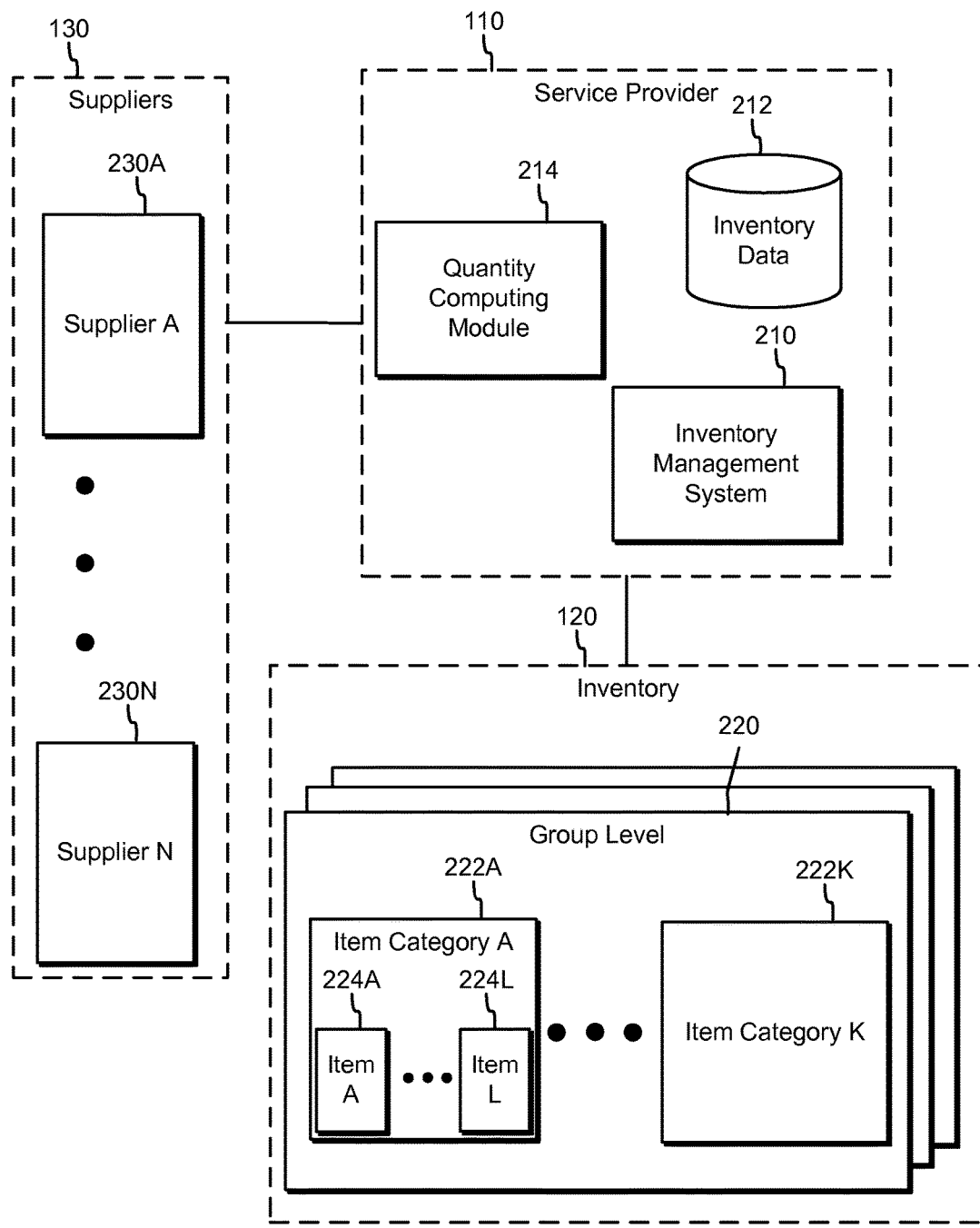
FIG. 2 is a block diagram illustrating an example inventory management system associated with offering items, according to embodiments.

The inventory management system and the quantity computing module may be used in conjunction to generate inventory plans for items over recurring planning horizons. FIG. 2 illustrates an example of an environment for using these two components in conjunction. In particular, the service provider 110 may operate an inventory management system 210 to manage inventory data 212. The service provider 110 may also operate a quantity computing module 214 to access and analyze the inventory data 212.

The inventory management system 210 may use the inventory data 212 to perform various inventory-related operations. For example, the inventory management system 210 may be implemented as a service on a computer system or may be specialized computing hardware configured to access, process, and output inventory data 212. The inventory management system 210 may be configured to plan for stocking items, track which items may be in-stock, which items may be out-of-stock, order and stock additional units of items, and other inventory-related operations.

A database or some other storage type may store the inventory data 212. The inventory data 212 may represent data related to the inventory 120. For example, the inventory data 212 may include historical and/or estimate data related to offering items. Some of the data may be stored in the database based on transactions associated with users (e.g., the service provide 1110, the suppliers 130, the customers 140, or other operators). Other data may be stored in the database based on an analysis of the already-stored data. For example, the inventory data 212 may include historical price realizations of items. A historical price realization of an item may represent a set of observed values indicating the actual sale prices of the item over a period of time. Similarly, the inventory data 212 may include historical demand realizations of items. A historical demand realization of an item may represent a set of observed values indicating the actual demand for the item over a period of time (e.g., the number of units sold, the number of users who requested information about the item, and/or other metric to measure a demand value). In another example, historical data may be analyzed by the quantity computing module 214. The result of the analysis may be stored as part of the inventory data 212 in the database.

The quantity computing module 214 may be configured to access and analyze the inventory data 212 to compute quantities for items for inventorying purposes. For example, the quantity computing module 214 may implement a model for analyzing the inventory data 212. The model may use an objective function to search for optimum quantities. An example objective function is illustrated in connection with FIG. 3. To reduce the complexity of the search, the model may be configured to express certain variables as functions of other variables and use these expressions in the objective function. For example, the historical price realizations and the historical demand realizations may be analyzed to identify correlations between the price variable and the demand variable. This analysis may include using pattern-recognition techniques, regression models, or machine learning algorithms. Based on these correlations, an expected realization of the price variable may be expressed as a function of the demand variable. The model may use the expected realization in lieu of the price variable in the objective function. This may reduce the complexity of the objective function to depend on the demand variable rather than both the demand variable and the price variable.

The quantities computed by the quantity computing module 214 may be used by the inventory management system 210 to generate an inventory plan. In an example, the inventory management system 210 may integrate, interface with, or subscribe to services of the quantity computing module 214. Further, one or each of the components may provide interfaces to allow users access to provided services. The interfaces may include web interfaces and/or application programming interfaces (APIs). A service of the inventory management system 210 may include providing the inventory plan and/or allowing inputs and outputs related to the inventory 120. A service of the quantity computing module 214 may include providing some or all of the computed quantities.

In an embodiment, operators of the inventory 120 may operate various computing systems to interface with the inventory management system 210 and/or the quantity computing module 214. The operators of the inventory 120 may be the same or a different entity than the service provider 110. In an example, some or all of the operators may represent automated processes and computing services. In particular, the operators may provide information about group levels 220, item categories 222, and items 224. An item category may represent a collection of items that may share at least one common feature. For example, digital single-lens reflex (DSLR) cameras from different manufactures may belong to a same item category of DSLR cameras. A group level may represent a group of item categories that may share at least one common feature. For example, a DSLR camera category and a digital compact camera category may belong to a same group of digital cameras. The hierarchy between items, item categories, and group levels may be repeated at multiple levels.

The provided information may include, for example, an identifier of a group level, identifiers item categories within that group level, identifiers of items within one category, and/or quantities of stored items. This information may also include observed values for various variables and constraints per group level, item category, and/or item. For example, the information may include sold prices, offered prices, observed demand, and other variable-related information. Capacity-related information may include information about constraints, such as a receipt constraint and a storage constraint. A receipt constraint may represent available labor and resources to receive and prepare an item for storage. A storage constraint may represent available storage space (e.g., physical storage volume such as cubic foot, data storage volume such as Gigabyte, etc.).

The suppliers 130, illustrated as suppliers 230A-N, may likewise operate computing systems to interface with the inventory management system 210. As explained herein above, the interface may be facilitated via web interfaces and/or APIs such that the suppliers may subscribe to services of the inventory management system 210 and/or the quantity computing module 214. Each of the suppliers 230A-N may provide items of a same item category or of different item categories. Further, each of the suppliers 230A-N may be associated with a supplier offer and a supplier constraint. A supplier offer may represent an offer for an item including, for example, a price, a promotion, a markdown, and/or a price match option. A supplier constraint may represent a capacity of a supplier to provide an item within a certain time period or across a plurality of time periods. For example, a supplier constraint may account for a lead time to manufacture and deliver an item. By interfacing with the inventory management system 210, the suppliers 230A-N may input information associated the various items including the supplier offers and constraints. In turn, this information can be stored as part of the inventory data 212.

Hence, by implementing the quantity computing module 214, the service provider 110 may access quantities of items to be inventoried. Further, by using these quantities in the inventory management system 210, the service provider 110 may automate the generation of the inventory plans. Further, because the quantities may be more optimal than those computed using previous approaches, the quality of the inventory plans may be improved, thereby improving the overall operations of the inventory management system 210. By also providing interfaces to various operators and to the suppliers 130, operations of the underlying systems of these users may be similarly improved.

Figure 3:
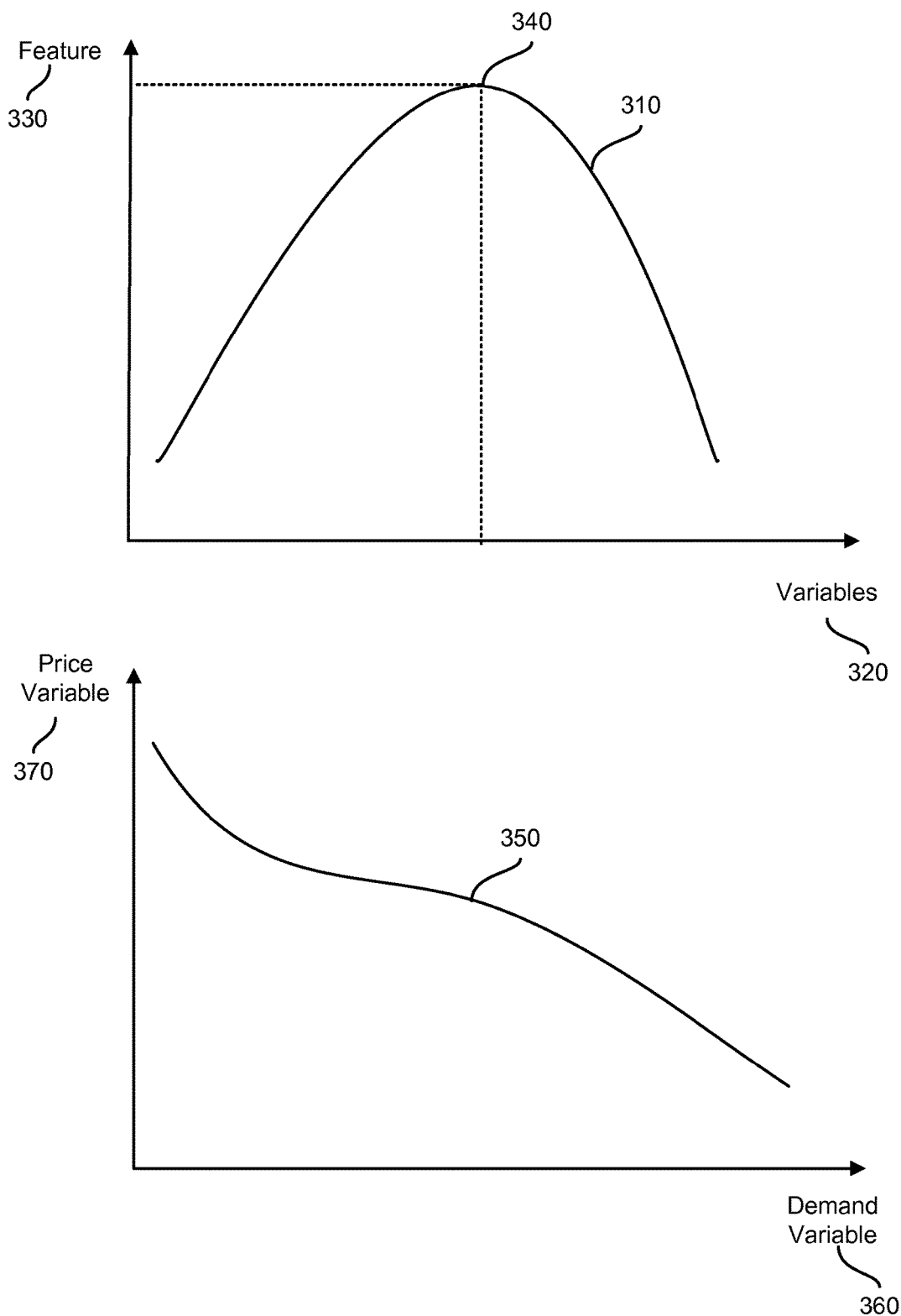
FIG. 3 illustrates an example feature and variables for analysis as part of generating an inventory plan, according to embodiments.

Turning to FIG. 3, the figure illustrates an example usage of an objective function 310 to find an optimum quantity 340. The objective function 310 may be used to search for the optimum quantity 340 based on maximizing a feature 330 over a set of variables 320. This usage is illustrated in FIG. 3 by plotting the objective function 310 as a function of the variables 320 and of the feature 330. It may be important to note that the plot is provided for illustrative purposes. As described herein above, there may be a large number of variables 320 (e.g., a price variable, a demand variable, influencing factor variables, and/or other variables). There may also be more than one feature 330. Thus, the objective function 310 may be multi-dimensional. Accordingly, the plot of the objective function 310 may also be multi-dimensional. Further, within each dimension corresponding to a variable, there may be multiple plots corresponding to potential realizations of that variable. Nonetheless, in the interest of clarity of explanation the plot is illustrated in FIG. 3 in two dimensions (the horizontal axis representing the variables 320 and the vertical axis representing the feature 330) encompassing the various potential realizations.

Searching for the optimum quantity 340 may include varying the realizations of the variables 320 and measuring the resulting feature. This process may be iteratively repeated until determining the maximum or the minimum feature and the realizations of the variables that may have resulted in this maximum or minimum. The optimum quantity may then be derived from these realizations. To illustrate consider the example of maximizing profit as the feature 330. In this example, there may be two variables 320: the price variable and the demand variable. Further, the price variable may be expressed as an expected realization based on the demand variable, thereby reducing the objective function 310 of this example to one variable (the demand variable). The optimum quantity 340 may correspond to a demand realization that may result in a peak (or maximum) profit as illustrated in FIG. 3.

As further illustrated in FIG. 3, an expected demand 350 may represent an expression of a price variable 370 as a function of a demand variable 360. The expected demand 350 may be used in the objective function 310 to reduce the complexity of finding the optimum quantity 340. As further described in connection with the next figures, the expected demand 350 may be determined, based on analysis of historical data such as data including historical price realizations and historical demand realizations. Generally, the analysis may identify correlations (linear and/or nonlinear) between the variables based on a number of attributes. FIG. 3 illustrates an example correlation. In particular, the expected realization 350 may reflect a situation where the lower the demand may be, the higher the price may be. The expected realization 350 may also reflect the inverse situation where the higher the demand may be, the lower the price may be. Other correlations may exist and techniques for determining the correlations are further described in connection with the next figures.

In an embodiment, the objective function may account for the variability of prices and customer demands, in addition to other variables (e.g., vendor lead time). This objective function may be used to maximize:

$$\pi(y) = \mathbb{E}_x[p \cdot \min(y,x) - cy + (r-h)c(y-x)^+ - \lambda(x-y)_+] = \mathbb{E}_x[\text{Profit}(y,x,p)], \quad (1)$$

where p represents sales price (e.g., a price variable) and other contribution profit (CP)-related revenue terms, c purchase cost from supplier and other contribution profit-related cost terms, h (or r) the ratio of holding cost (or salvage value) as a percentage of purchase cost, λ the penalty for lost sales, and $x^+ := \max\{x, 0\}$. Instead of assuming p as a constant, p may be modeled as a random variable.

To reduce the complexity of the objective function, an expected realization of p as a function of a demand variable may be used. In an embodiment, this expected realization may be modeled based on a joint distribution of demand and price. As such, the objective function may be expressed as:

$$\pi r(y) = \mathbb{E}_{x,p}[p \cdot \min(y,x) - cy + (r-h)c(y-x)^+ - \lambda(x-y)^+]. \quad (2)$$

The joint distribution of demand and price may be estimated to calculate the expectation in (2). However, this estimation may be computationally intensive. Instead, by taking the conditional expectation on p in (2), the objective function may be reformulated as:

$$\pi r(y) = \mathbb{E}_x[\mathbb{E}_{p|x}[p]\min(y,x) - cy + (r-h)c(y-x)^+ - \lambda(x-y)^+]. \quad (3)$$

To avoid the complexity in estimating the distribution of p and the expectations of three nonlinear functions, the expectation in the other order may not be taken, which may result in expressing the objective function as:

$$\pi(y) = \mathbb{E}_p[p \cdot \mathbb{E}_{x|p}[\min(y,x)] - cy + (r-h)c\mathbb{E}_{x|p}[(y-x)^+] - \lambda \cdot \mathbb{E}_{x|p}[(x-y)^+]]$$

In equation (3), the expected realization of the price variable (e.g., $\mathbb{E}_{p|x}[p]$) corresponding to different customer demand may be predicted. $\mathbb{E}_{p|x}[p]$ can be interpreted as the most plausible price given the demand value. By taking the derivative of (3) in y, the optimality condition may be obtained as:

$$(\lambda - c) - (\lambda + ch - cr)F(y) + \int_{x=y}^{+\infty} \mathbb{E}_{p|x}[p]f(x)dx = 0, \quad (4)$$

where $f(\cdot)$ and $F(\cdot)$ are respectively the probability distribution function (PDF) and CDF cumulative distribution function (CDF) of the demand, and $\mathbb{E}_{p|x}[p]$ denotes the conditional expectation of the sales price p given the demand x. With the parameters λ, c, h, r and $f(x)$, $F(x)$ may be forecasted (e.g., determined by implementing or interfacing with a forecasting service that may analyze historical data to generate the forecasts). Accordingly, it may be sufficient to find estimations of $\mathbb{E}_{p|x}[p]$ for each item in equation (4). Thus, rather than setting the price p as a constant, the objective function may be updated to replace p in equation (2) with $p(x) := \mathbb{E}_{p|x}[p]$.

As described herein above, estimating the expected realization of the price variable may be based on analysis of historical data including, for example, historical price and demand realizations. To improve the accuracy of the estimation, a pool of items may be grouped together and the historical data of these items may be analyzed. These items may share similar or common features (e.g., may belong to a same category) and/or attributes (e.g., price, historical price standard deviation, coefficient of variation (CoV) of price, competition level (the percentage of customer demand fulfilled by the service provider relative to suppliers), profit margin, CoV of demand, and/or other item attributes). However, by pooling the items together, aggregating and using the data for analysis may be challenging. That may be because when data of multiple items is considered, these items may be associated with different price and demand scales.

Accordingly, price and demand variables (or realizations thereof) may be normalized to allow the aggregation and analysis of the associated data. The normalization may result in respective surrogates that may be used for the analysis. In an embodiment, a surrogate of the price variable may be a price ratio. In comparison, a surrogate of the demand variable may be a demand percentile. Examples of these surrogates are illustrated in FIG. 4.

As described herein above, an expected realization of a price variable may be expressed as a function of a demand variable for use in an objective function. To generate the expected realization, historical data may be analyzed. Although the objective function may be used to determine an optimum quantity for a particular item, the analyzed historical data may be associated with a plurality of items, including the particular item in some examples. The consideration of the plurality of items may improve the accuracy of the expected realization in certain situations (e.g., when insufficient data may be associated with the particular item). In an embodiment, to properly analyze the historical data across the plurality of items, certain data may be normalized. For example, the normalizations may be applied to historical price realizations and historical demand realizations resulting in a price surrogate and a demand surrogate, respectively. These surrogates may then be used to generate the expected realization. For example, the surrogates may be provided (e.g., inputted) to pattern-recognition algorithms, regression models, and/or machine learning algorithms. Other types of information may also be provided such as price ranges, price change frequencies, demand ranges, demand change frequencies, costs, and/or competition levels associated with the plurality of the items. Based on the provided surrogates and other information, the expected realization may be outputted.

Figure 4:
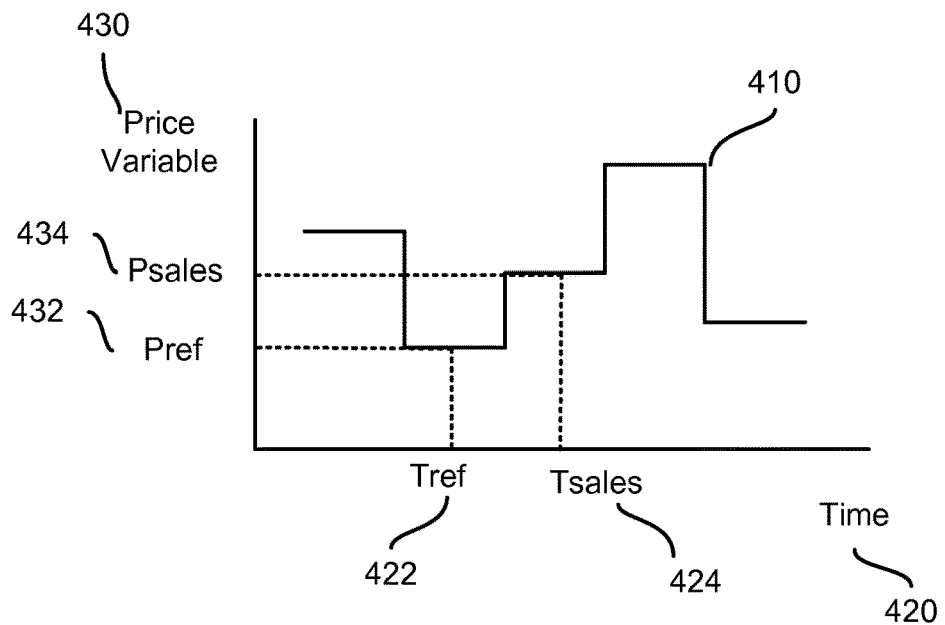
FIG. 4 illustrates an example analysis of variables, according to embodiments.
Figure 4:
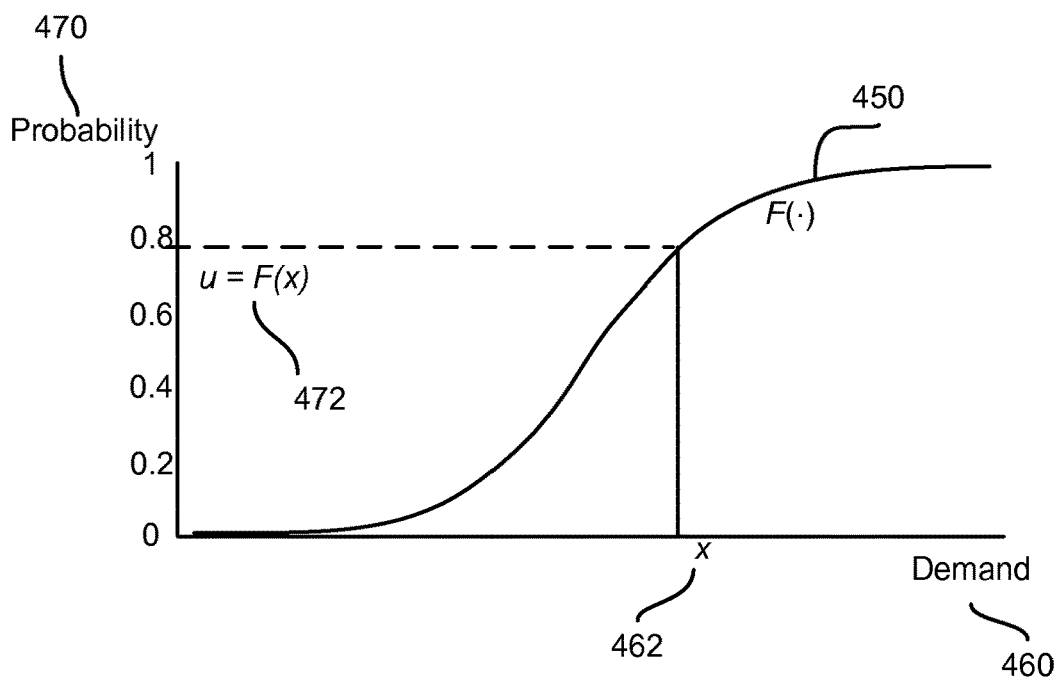

FIG. 4 illustrates historical data usable to determine two example surrogates: a price surrogate and a demand surrogate. The example price surrogate may include a price ratio "$p_\delta$" and may be associated with a price variable of an item. The example demand surrogate may include a demand percentile "u value" and may be associated with a demand variable of the item.

In an embodiment, the price ratio "$p_\delta$" may be generated from analyzing historical price realizations 410 of the item. The historical price realizations 410 may represent observed price values of the price variable 430 over time 420. At a particular point in time "$t_{ref}$" 422, a price realization "$p_{ref}$" 432 may be observed. In an example, the time "$t_{ref}$" 422 may correspond to reference time. The reference time may represent a particular point in time (e.g., a particular day of the week) usable to normalize the price variable. The associated "$p_{ref}$" 432 may represent a reference value that may be used in the objective function. At another point in time "$t_{sales}$" 424, another price realization "$p_{sales}$" 434 may be also observed. The time "$t_{sales}$" 424 may correspond to a time of sales, which may be a point in time other than the time "$t_{ref}$" 422. As such, the price ratio "$p_\delta$" may represent the percentage change of the realized sales price "$p_{sales}$" 434 compared to the observed price "$p_{ref}$" 432, where the "$p_{ref}$" 432 may be used in the objective function. Accordingly, the price ratio "$p_\delta$" may be expressed as:

$$p_\delta = \frac{p_{sales} - p_{ref}}{p_{ref}}. \quad (5)$$

In an embodiment, the demand percentile "u value" may be generated based on historical demand realizations of the item. The historical demand realizations may be used to generate a cumulative distribution function (CDF) 450 of the demand variable. The CDF 450 may represent a probability of demand realizations 470 over the demand variable 460 (or demand realizations). Thus, the CDF 450 may also represent a demand forecast. A particular demand percentile "u value" 472 may represent a percentile of a demand realization "x" 462 being realized (e.g., u=F(x), where F(•) corresponds to the CDF 450).

Once the price ratio "$p_\delta$" and the demand percentile "u value" are generated, a relationship (e.g., a correlation) between the two surrogates may be estimated. That relationship may be used in the expected realization of equation (4). For example, the relationship between $p_\delta$ and u may be characterized as a function $p_\delta(u)$, then $\mathbb{E}_{p|x}[p]$ in equation (4) can be approximated by:

$$\mathbb{E}_{p|x}[p] \approx p_{ref}(1+p_\delta(F(x))). \quad (6)$$

Finding a relationship between the "price ratio "$p_\delta$" and the demand percentile "u value" may essentially be similar to finding a relationship between the price and demand variables. However, using the relationship between price ratio "$p_\delta$" and the demand percentile "u value" may simplify the process of finding the optimum quantity by using the expected realization from equation (6) in the objective model. The similarity between finding relationships between the variables and between the surrogates may be illustrated in the following equations. In particular, since $$\pi(y) = \mathbb{E}_x[\mathbb{E}[p|x]\min(y,x) - cy + (r-h)c(y-x)^+ - \lambda(x-y)^+] =$$

$$\int_0^y \left[\int_0^{+\infty} p \cdot f_{p|x}(p|x) \cdot x \, dp - cy + (r-h)c(y-x)\right] f(x) \, dx +$$

$$\int_y^{+\infty} [y \cdot \mathbb{E}_{p|x}[p] - cy - \lambda(x-y)] f(x) \, dx,$$

then $$\pi'(y) = \left[\int_0^{+\infty} p \cdot f_{p|x}(p) \cdot y \, dp - cy\right] f(y) +$$

$$\int_0^y [-c + c(r-h)] f(x) \, dx - [y \cdot \mathbb{E}_{p|x}[p] - cy] f(y) +$$

$$\int_y^{+\infty} [\mathbb{E}_{p|x}[p] - c + \lambda] f(x) \, dx =$$

$$\int_0^y [-c + c(r-h)] f(x) \, dx + \int_y^{+\infty} [\mathbb{E}_{p|x}[p] - c + \lambda] f(x) \, dx =$$

$$(\lambda - c) - (\lambda + ch - cr) F(y) + \int_{x=y}^{+\infty} \mathbb{E}_{p|x}[p] f(x) \, dx.$$

By setting the last equation to zero, the optimal condition in equation (4) may be obtained as:

$$(\lambda - c) - (\lambda + ch - cr) F(y) + \int_{x=y}^{+\infty} \mathbb{E}_{p|x}[p] f(x) \, dx = 0.$$

By using the example price and demand surrogates, the equation (4) can further be transformed to:

$$(\lambda - c + p_{ref}) - (p_{ref} + \lambda + ch - cr) CR^* + p_{ref} \int_{CR^*}^1 p_\delta(u) \, du = 0. \quad (7)$$

By using the derived relationship "$p_\delta(u)$", it may be possible to obtain a better estimation of sales prices under a specific norm. However, the model may perform slightly differently based on the norm. Other norm choices may be available. For example, a mean of or a variation of the mean of the relationship "$p_\delta(u)$" may be used as an example of a norm. To illustrate, the "u value" may be fixed. If there are "N" items ("N" being an integer) with reference prices $p_{ref}^{(i)}$, sales price $p_{sales}^{(i)}$ may be unknown, but a trend may be known from the historical price realizations as: mean $$\left(\frac{p_{sales}^{(i)} - p_{ref}^{(i)}}{p_{ref}^{(i)}}\right) = \alpha.$$

Then $p_{est}^{(i)} := \alpha \cdot p_{ref}^{(i)}$ may be the best estimator of $p_{sales}^{(i)}$ in the sense that $\alpha$ may minimize:

$$\sum_{i=1}^N \left(\frac{\alpha \cdot p_{ref}^{(i)} - p_{sales}^{(i)}}{p_{ref}^{(i)}}\right)^2. \quad (8)$$

Here α may represent mean ($p_\delta$) corresponding to the $p_\delta(u)$ estimation.

In another example, the norm may be chosen to minimize:

$$\sum_{i=1}^{N}\left(\frac{\alpha \cdot p_{ref}^{(i)} - p_{sales}^{(i)}}{p_{sales}^{(i)}}\right)^2. \quad (9)$$

In this case, the optimal choice of α may be $$\alpha = \frac{\Sigma \frac{p_{ref}^{(i)}}{p_{sales}^{(i)}}}{\Sigma \left(\frac{p_{ref}^{(i)}}{p_{sales}^{(i)}}\right)^2} - 1,$$

and $\alpha \cdot p_{ref}^{(i)}$ may be the best estimator of $p_{sales}^{(i)}$ under this norm in equation (9).

In another example, the norm may be chosen to be:

$$\sum_{i=1}^{N}\left|\frac{\alpha \cdot p_{ref}^{(i)} - p_{sales}^{(i)}}{p_{sales}^{(i)}}\right|. \quad (10)$$

In this example, the optimal condition may be:

$$\sum_{i=1}^{N}\text{sgn}\left(\frac{\alpha \cdot p_{ref}^{(i)} - p_{sales}^{(i)}}{p_{sales}^{(i)}}\right) \cdot \frac{p_{ref}^{(i)}}{p_{sales}^{(i)}} = 0.$$

Further, $\alpha^{(i)}$ may be defined as $$\alpha^{(i)} = \frac{p_{sales}^{(i)}}{p_{ref}^{(i)}} - 1,$$

and may be assumed to be an increasing sequence. Accordingly, α can be chosen to be any number between $\alpha^{(k)}$ and $\alpha^{(k+1)}$ such that $$\sum_{i=1}^{N}\text{sgn}\left(\frac{\alpha \cdot p_{ref}^{(i)} - p_{sales}^{(i)}}{p_{sales}^{(i)}}\right) \cdot \frac{p_{ref}^{(i)}}{p_{sales}^{(i)}}$$

may be as close to zero as possible.

In another example, the norm may be chosen to be:

$$\sum_{i=1}^{N} s^{(i)} |(1+\alpha)p_{ref}^{(i)} - p_{sales}^{(i)}|, \quad (11)$$

In this example, the optimal condition may be:

$$\sum_{i=1}^{N} s^{(i)} p_{ref}^{(i)} \cdot \text{sgn}((1+\alpha)p_{ref}^{(i)} - p_{sales}^{(i)}) = 0.$$

Here, α can also be chosen between $\alpha^{(k)}$ and $\alpha^{(k+1)}$ such that $$\sum_{i=1}^{N} s^{(i)} p_{ref}^{(i)} \cdot \text{sgn}((1+\alpha)p_{ref}^{(i)} - p_{sales}^{(i)})$$

may be as close to zero as possible.

By using price and demand surrogates, using the objective function may be improved (e.g., computationally simplified) to find, for example, the optimum quantity. To achieve such an improvement, the relationship "$p_\delta(u)$" between the surrogates may be estimated. In an embodiment, the surrogates may be provided (e.g., inputted) to pattern-recognition algorithms, regression models, and/or machine learning algorithms, along with other information to output the relationship "$p_\delta(u)$" (and/or the expected realization based on equation (6)). To do so, historical price and demand realizations over a particular time frame (e.g., six months), over a plurality of items may be accessed and used.

Figure 5:
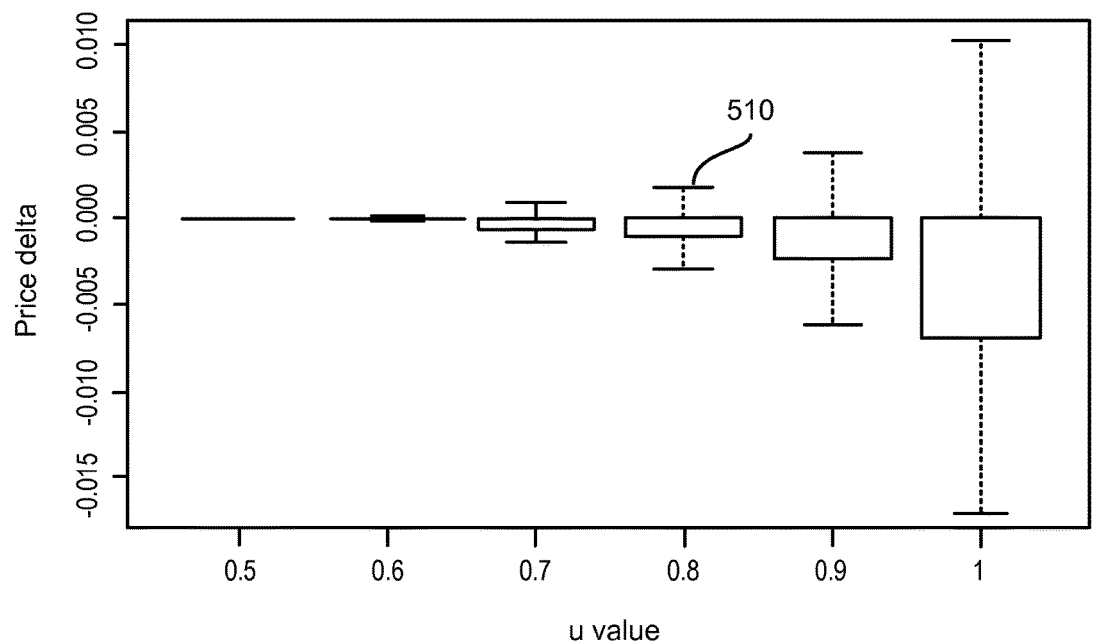
FIG. 5 illustrates example functions for analysis, according to embodiments.
Figure 5:
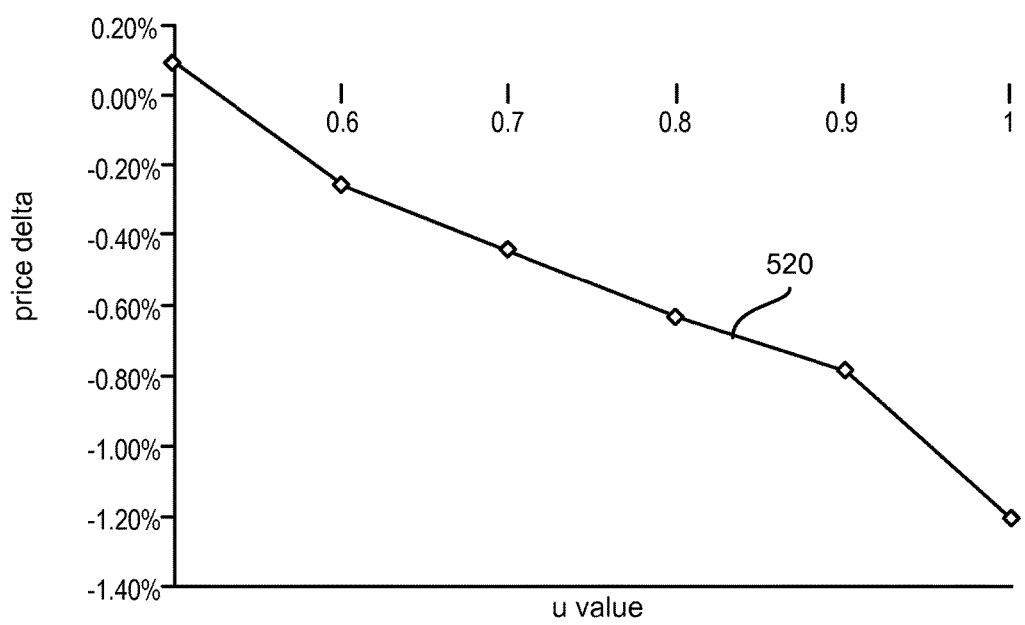

FIG. 5 illustrates examples of estimated relationships (e.g., correlations) between surrogates based on analyzed historical data. As illustrated, a boxplot 510 and a curve 520 may be used to characterize the relationships. However, other types of characterizations may be similarly used. The example boxplot 510 may illustrate a situation where the distribution of the price ratio "$p_\delta$" may have a larger standard deviation when "u value" may be close to one. This may result in a relatively less accurate estimation of $p_\delta(1)$. To have a better estimation, historical data for a statistically large enough number of items may be analyzed.

In comparison, the illustrated example curve 520 may be flat in the middle and more acute at two ends. On the right side, the curve may be steep since a high demand may more likely be correlated with a larger drop in the price. On the left side, the steepness may be caused by the aggregation of the data for all the points with "u value" below 0.5.

Generally, and as illustrated in the above two examples, the price ratio "$p_\delta$" and the demand percentile "u value" may have a negative correlation. For example, a high (low) demand may usually accompany a lower (higher), and subsequently a lower (higher) sales price relative to the reference price. Of course other types of relationships may also exist between the surrogates. These relationships may be estimated from the analysis of historical data associated with a plurality of items.

When historical data for a plurality of items is analyzed to determine relationships between surrogates (e.g., the relationship "$p_\delta(u)$" between the price ratio "$p_\delta$" and the demand percentile "u value"), the relationships may differ for items with different attributes. Accordingly, the items may be segmented in groups based on one or more of the attributes. In an example, items belonging to a same group may have a common set of attributes such that estimated relationships between surrogates may be similar for these items. In other words, grouping the items based on one or more of the attributes may improve the estimations of the surrogate relationships and, accordingly, the computation of the optimum quantities for the different items.

The attributes used for the segmentation may represent attributes affecting the relationships between the price and demand variables (and/or the respective surrogates). For example, these attributes may include price values, price standard deviations, coefficients of price value variations, competition levels, profit values, profit margins, and/or coefficients of demand value variations.

To illustrate, consider the profit margin as an example attribute. Items can be segmented based on the respective profit margins. For instance, one group may include items with low profit margins (e.g., less than ten percent). Another group may include items with high profit margins (e.g., greater seventy-five percent). Yet another group may include remaining items (e.g., medium profit margins between ten and seventy-five percent). Accordingly, three relationships "$p_\delta(u)$" may be generated, one for each group. Each of the relationships "$p_\delta(u)$" may be generated based on historical data of the items from the respective group. For a particular item belonging to one of the three groups, the respective relationship "$p_\delta(u)$" may be used in the model (e.g., the objective function) to determine the optimum quantity. The resulting optimum quantities may improve the contribution profits of the items. In certain situations, the improvement for an item in the low profit margin group may be relatively larger than that of items in the other groups. The improvements and/or the relative improvement may be used as a decision or design parameter in the model. In other words, the model may selectively use the derived relationships "$p_\delta(u)$" or may be selectively applied based on the potential improvement to the contribution profits. For example, the model may use a relationship "$p_\delta(u)$" for the items in low profit margin group. However, for high profit margin items, the model may not use the respective relationship "$p_\delta(u)$."

As described herein above, the relationships "$p_\delta(u)$" may behave differently for various attributes and/or attribute values. Segmenting items and obtaining respective relationships "$p_\delta(u)$" may improve the accuracy of computing the optimum quantities. This may result in improvements to contribution profits. To properly segment items, historical data (e.g., four weeks to six months of observed data) for the items may be analyzed in a testing or simulation environment. In an example, the analysis may consider various combinations of attributes to generate groups, generate the respective relationships "$p_\delta(u)$," and measure the resulting improvements. Based on this analysis, rules may be generated. The rules may define how items may be segmented based on what combination of attributes. For example, the analysis may demonstrate that using the relationships "$p_\delta(u)$" for items in groups of high price values, high price variability, high coefficient of variation of demand, low competition level, and/or low price variability margin may result in a large enough improvement to the contribution profits resulting from the optimum quantities. As such, the rules may specify that a relationship "$p_\delta(u)$" may be used to derive an optimum quantity for an item only if the item belongs to one of these groups.

In addition, the segmentation may be multi-dimensional across the attributes. In other words, a group may be associated with a plurality of attributes. For example, a group may include item rules that may have a high price value and a low profit margin. Additionally or alternatively to multi-dimensional groups, multi-dimensional rules may also be generated and used. These rules may specify a plurality of attributes that an item should exhibit. For example, the rules may specify that a relationship "$p_\delta(u)$" mat be used only if the item has a high price value and a low profit margin.

Hence, by segmenting items based on various item-related attributes, estimating relationships between surrogates may be improved. Further, the segmenting may also improve the computation of the optimum quantities and the resulting contribution profits. As such, the model used by a quantity computing module (e.g., the quantity computing module 214 of FIG. 2) may be further refined. For example, the model may apply available rules to determine what surrogate relationships should be applied to what items.

Figure 6:
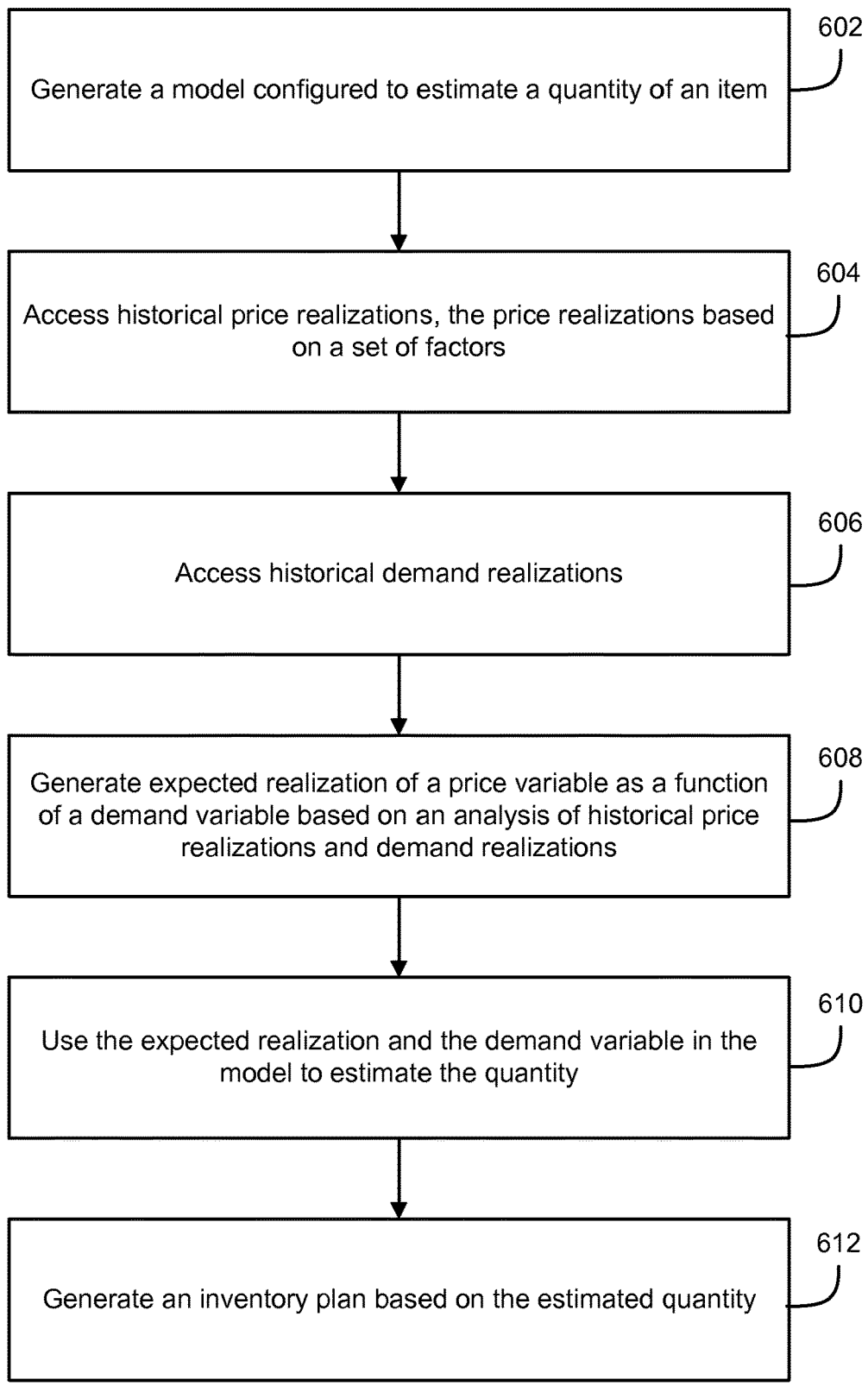
FIG. 6 is a block diagram illustrating an example flow for analyzing variables as part of generating an inventory plan, according to embodiments.
Figure 7:
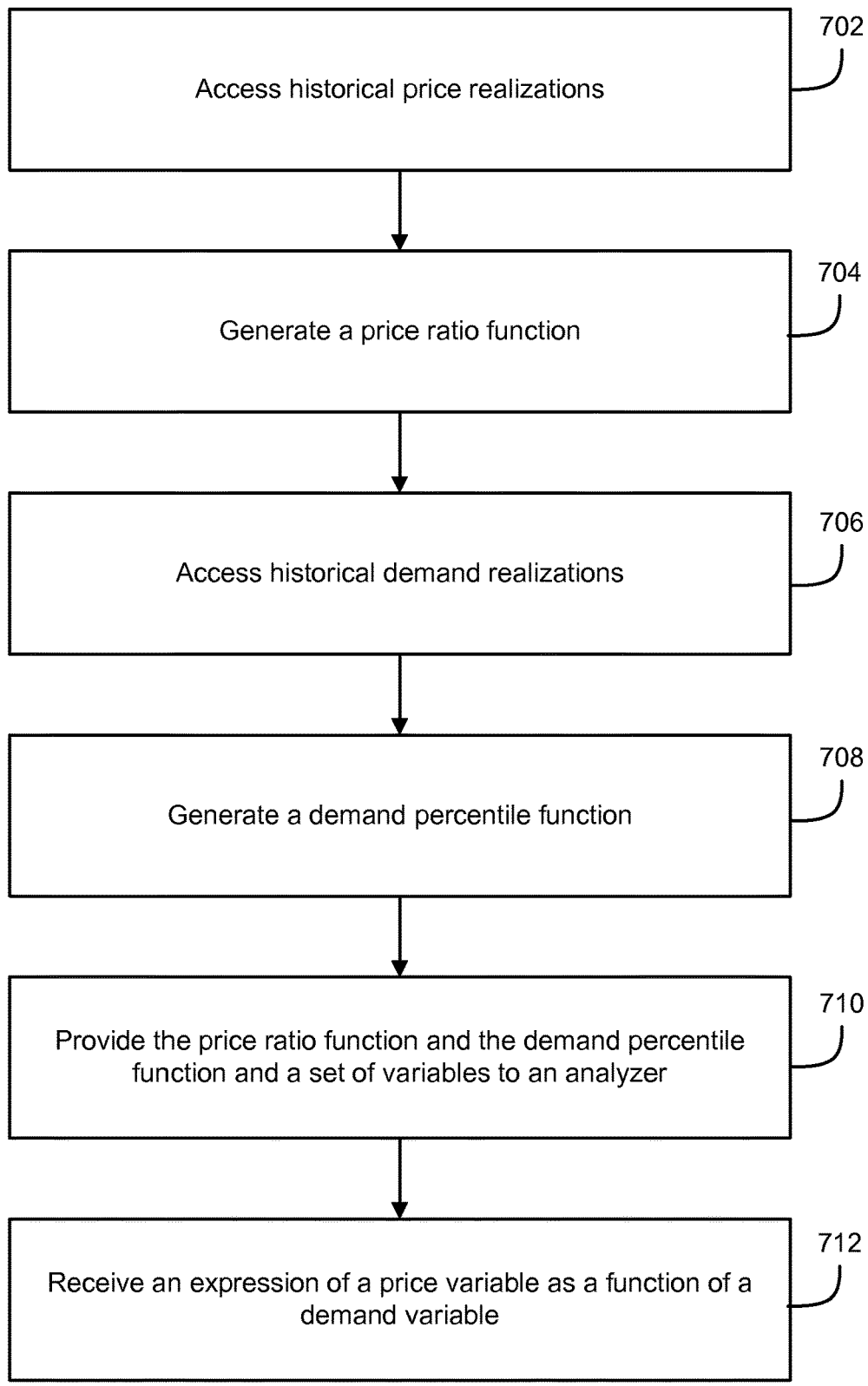
FIG. 7 is a block diagram illustrating an example flow for analyzing variables to generate functions, according to embodiments.
Figure 8:
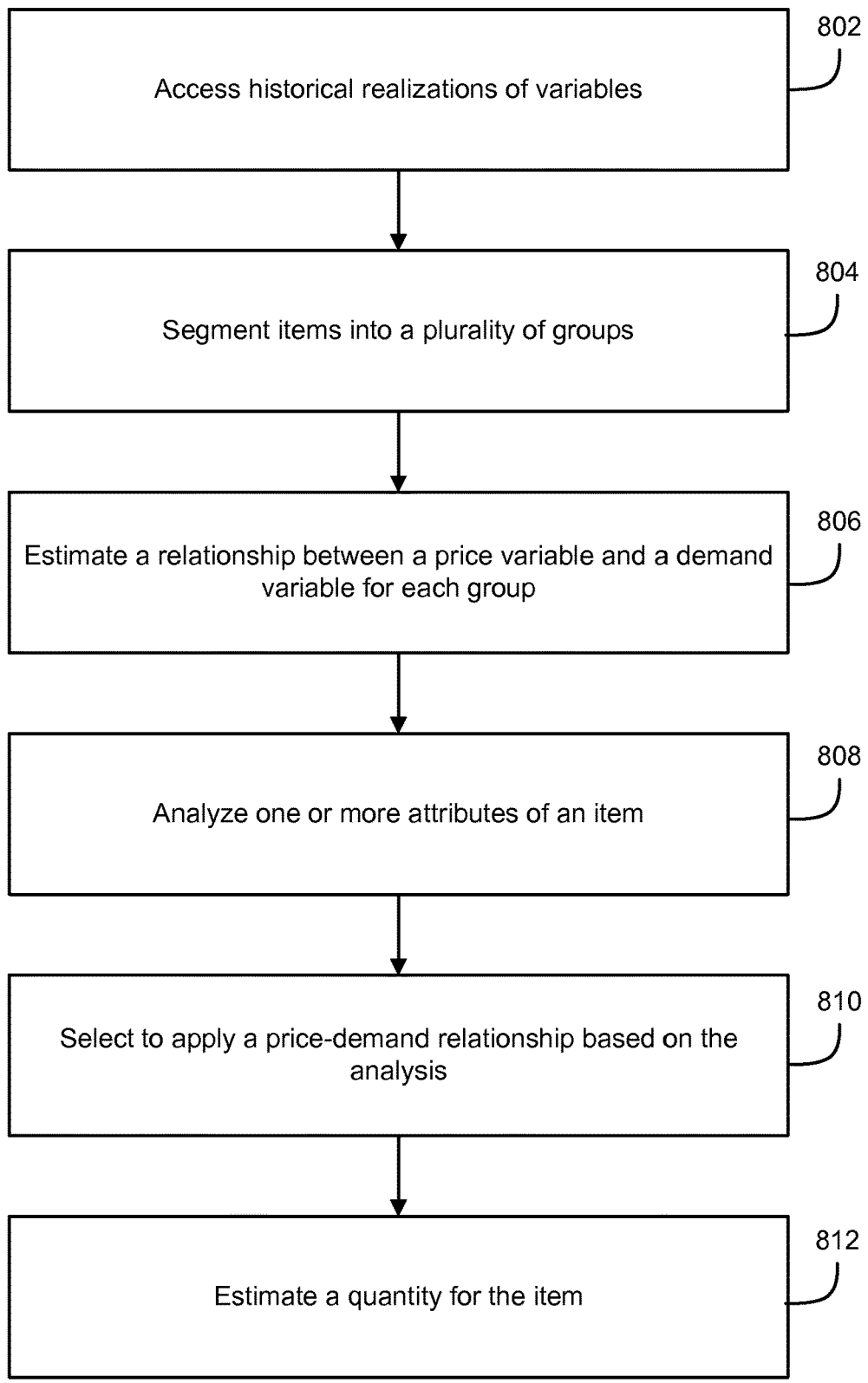
FIG. 8 is a block diagram illustrating an example flow for selecting a function usable in an analysis associated with an item, according to embodiments.

Turning to FIGS. 6-8, the figures illustrate example flows related to computing optimum quantities for items. In particular, FIG. 6 illustrates an example flow for analyzing variables as part of generating an inventory plan. In comparison, FIG. 7 illustrates an example flow for generating functions that may correlate variables. FIG. 8 illustrates an example flow for selecting a function usable in an analysis of variables. Some operations across the example flows may be similar. Such similarities are not repeated herein in the interest of clarity of explanation.

In the interest of clarity of explanation, the example flows of FIG. 6-8 illustrate two variables: a price variable and a demand variable. In addition, the example flows illustrate using the respective surrogates: a price surrogate (e.g., the price ratio "$p_\delta$") and demand surrogate (e.g., the demand percentile "u value"). Likewise, the example flows illustrate using relationships between the surrogates (e.g., relationships "$p_\delta(u)$"). Nevertheless, the embodiments described herein are not limited as such. Instead, the example flows may similarly apply to other variables, surrogates, and/or relationships.

Further, in the illustrative operations, some of the operations or functions may be embodied in, and fully or partially automated by, modules executed by one or more processors. For example, a quantity computing model hosted on a computing resource (e.g., the quantity computing module 214 of FIG. 2) may be configured to perform some of the operations. Example quantity computing models are further illustrated in FIGS. 9 and 10. Nevertheless, other, or a combination of other, computing resources and modules may be additionally or alternatively used. Also, while the operations are illustrated in a particular order, it should be understood that no particular order is necessary and that one or more operations may be omitted, skipped, and/or reordered.

Turning to FIG. 6, the illustrated example flow may start at operation 602, where a model configured to estimate a quantity of an item may be generated. For example, the quantity computing module or another computing service may generate the model. Estimated quantity may represent an optimum quantity or amount associated with an item that should be inventoried during a planning horizon.

The model may be set-up to use an objective function to compute such a quantity. The objective function may optimize a feature, such as profit, over a set of variables. This set may include a price variable and a demand variable. The price variable may be random. Observed values (e.g., realizations) of the price variable may be influenced by a number of factors, such as price matching, promotions, markdowns, or vendor-associated list prices. An example objective function is illustrated in equation (1).

At operation 604, historical price realizations may be accessed. For example, the quantity computing module may access this and other historical data from a data store. The historical price realizations may represent observed price values for a plurality of items over a period of time (e.g., six months). These price values may be based on one or more of the factors. For example, certain or all of the historical price realizations may be influenced or affected, directly or indirectly by price matching, promotions, markdowns, or vendor-associated list prices.

In an example, the quantity computing module may determine that the item may belong to a particular group of items. The group may represent a segmentation of items based on one or more common item attributes. Example segmentation operations are further illustrated in FIG. 8. As such, the quantity computing module may access historical price realizations associated with the group.

At operation 606, historical demand realizations may be accessed. For example, the quantity computing module may access this and other historical data from the data store. This access may be similar to the one of operation 604, except that the access may be associated with the demand variable rather than the price variable.

At operation 608, an expected realization of the price variable may be generated as a function of the demand variable based on, for example, the historical price and demand realizations. The expected realization may include or represent a conditional distribution of the price variable based at least on a distribution of the demand variable. In an example, the quantity computing module may analyze the historical price realizations, the historical demand realizations, and/or other historical data to generate the expected realization. The other historical data may be accessed from the data store and may include one or more of: price ranges, price change frequencies, demand ranges, demand change frequencies, costs, or competition levels. The analysis may apply one or more of pattern recognition algorithms, regression models, or machine learning algorithms.

In an embodiment, generating the expected realization may include using surrogates of the variables, such as price and demand surrogates. The analysis of the historical data may determine relationships, such as correlations, between the surrogates. The quantity computing module may use these relationships to define the expected realization. In other words, the model may be updated to use these relationships. The model update may include, for example, updating the objective function as shown in equation (4). Example operations for determining and using surrogates and surrogate relationships are further illustrated in the example flow of FIG. 7.

At operation 610, the expected realization and the demand variable may be used to estimate the quantity. For example, the quantity computing module may use (e.g., input) the expected realization and the demand variable in the updated model (e.g., update objective function of equation (4)). This may enable computing the quantity based on maximizing or minimizing one or more features (e.g., maximizing profit, minimizing holding costs and losses, etc.) over a set of variables (e.g., the demand variable).

At operation 612, an inventory plan may be generated based on the estimated value. For example, the quantity computing module may provide (e.g., output) the estimated quantity as a service to various processes. One process may be associated with an inventory management system. Another process may be associated with a supplier subscribed to receive the estimated quantity as a service. Regardless of the process, providing the estimated quantity may cause or enable the inventory plan to be generated. This plan may include acquiring units of the item for inventorying according to the estimated quantity.

Turning to FIG. 7, the figure illustrates an example flow for generating functions that may correlate variables. In particular, the example flow illustrates generating a relationship between surrogates of variables. That relationship may be used to update an objective function and, accordingly, estimate an optimum quantity.

The example flow of FIG. 7 may start at operation 702, where historical realizations of a price variable may be accessed. In an example, the historical price realizations may be associated with a group of items, where the group may represent a segmentation of the items based on one or more attributes. The historical price realizations may include price values observed during a time frame. The quantity computing module may access this historical data from a data store.

At operation 704, a price ratio function may be generated based on the historical price realizations. For example, the quantity computing module may determine price references and sales prices. The computing module may also compute and normalize variations associated with the price variable based on the price references and sales prices. In an example, the variations may be computed and normalized per item by using equation (3). The collection of price ratios per item may represent a function. The collection of the functions over the different items of the group may also represent another function.

At operation 706, historical demand realizations may be accessed. This access may be similar to the one of operation 704, except that the access may be associated with the demand variable rather than the price variable.

At operation 708, a demand percentile function may be generated based on the historical demand realizations. For example, the quantity computing module may generate a cumulative distribution function for each of the items in the group based on the respective historical demand realizations. Each of the cumulative distribution function may represent a demand percentile function associated with the respective item. In addition, the quantity computing module may generate a cumulative distribution function for the group based on the various historical demand realizations.

At operation 710, one or more of the price ratio functions and one or more of the demand percentile functions may be provided to an analyzer. In an example, the quantity computing module may integrate or interface with the analyzer. The analyzer may be configured to apply one or more of pattern recognition techniques, regression models, or machine learning algorithms to the provided price ratio and demand percentile functions. Accordingly, the analyzer may output relationships, such as correlations, between the various price ratio and demand percentile functions. These relationships may represent relationships between the price and demand surrogates and may be similar to the relationships between the price and demand variables. This similarity of relationships may enable the use of the price ratio and demand percentile functions to estimate an expected realization of the price variable as a function of the demand variable, as illustrated in equation (4).

At operation 712, an expression of the price variable as a function of the demand variable may be received. For example, the analyzer may output the relationships between the price ratio and demand percentile functions to the quantity computing module. In turn, the quantity computing module may update the expected realization of the price variable based on equation (4).

Turning to FIG. 8, the figure illustrates an example flow for selecting a function usable in an analysis of variables. In particular, the example flow illustrates segmenting items in a group and selecting surrogate relationships based on the groups. Because surrogate relationships may vary based on attributes of items, the segmenting and the selecting may improve the accuracy of estimated quantities of items.

The example flow of FIG. 8 may start at operation 802, where historical realizations of variables may be accessed. For example, the quantity computing module may access historical price realizations and historical demand realizations associated with a plurality of items from a data store.

At operation 804, the items may be segmented into a plurality of groups. An item may be added to one or more groups based on attributes of the item (price, profit margin, etc.). The attributes may include, for example, price, price standard deviation, coefficient of price variation, competition level, profit, or coefficient of demand variation. In particular, the attributes may correspond to different variables (e.g., a price variable, a profit margin variable, etc.) associated with items. Each of these variables may occupy a range of attribute values (e.g., price values, profit margin values, etc.). A group may be associated with particular values or value ranges for one or more attributes (e.g., low profit margins, high prices, etc.). The quantity computing module may add an item to a group if the item exhibits an attribute value(s) associated with the group (e.g., the item may be highly priced and yield a low profit margin).

In an embodiment, each group may be predefined. Accordingly, each group may be associated with a number of attributes (e.g., price, profit margin, etc.). Further, each group may be associated with a number of rules specifying condition(s) to add items to the group (e.g., the conditions for a group may be that an item should be highly priced and yield a low profit margin).

To predefine the groups, an analysis of portions of the historical realizations may be performed based on observed values of these attributes. The analysis may be conducted in a test or simulation environment to determine what segmentation may result in improvements. This type of analysis may also enable generating rules to associate an item with one of the groups and/or to select surrogate relationship(s) to use for estimating the optimum quantity for that item.

For example, the quantity computing module may generate potential groups, each associated with one or more attributes and respective attribute values or ranges. For each potential group, the quantity computing module may consider a set of the historical price and demand realizations to analyze. In general, the size of a set may be based on having statistically sufficient data for the analysis. For instance, for the price attribute, four weeks of data may be considered. In comparison, for the coefficient of price variation, historical data for a longer period of time may be considered. The quantity computing module may then analyze the historical realizations of each set to compute price and variable surrogates, estimate surrogate relationships, and determine whether improvements to estimating the optimum quantities and the resulting contribution profits may occur. If so, the potential group associated with the set may be recognized as a predefined group. In addition, the quantity computing module may store and identify the computed surrogates and surrogate relationship(s) for that group. Accordingly, one or more rules may be generated. For instance, a rule may specify that items having attribute values or attribute ranges meeting the ones of the group may be added to the group. The rule may also specify that, for an item added to the group, the stored surrogate relationship(s) of that group may be used in estimating the optimum quantity of the item.

To illustrate, the quantity computing module may consider a group associated with low profit margins (e.g., less than ten percent) as a potential group. Items having low profit margins may be identified and associated historical and price realizations covering a six week time period may be accessed. These historical realizations may be analyzed to compute price and variable surrogates, estimate a surrogate relationship, and determine that improvements to estimating the optimum quantities and the resulting contribution profits may occur. As such, the quantity computing module may recognize this group as a predefined group. The quantity computing module may also generate a rule specifying that items having low profit margins may be added to the group and that the surrogate relationship of the group may be applied to compute any of the optimum quantities of the items in the group.

At operation 806, a relationship between the price variable and the demand variable may be estimated for each group. For example, the quantity computing module may set a surrogate relationship of the group as representative of the relationship between the price and demand variables. As described in connection with operation 804, the surrogate relationship may be derived in a test or simulation environment and stored for subsequent usage.

At operation 808, one or more attributes of an item may be analyzed. For example, the item may be associated with a request to the quantity computing module for computing an optimum quantity. In turn, the quantity computing module may access historical data associated with the item from a data store and analyze various realizations of variables. These variables may correspond to attributes of the predefined groups. If the item exhibits realizations (e.g., values) that meet one or more rules of one or more groups, the quantity computing module may add the item to the one or more groups.

At operation 810, a price-demand relationship may be selected based on the analysis described in connection with operation 808. For example, if the item was added to a particular group, the quantity computing module may select a price-demand surrogate relationship associated with the group. This selection may be based on, for example, the one or more rules of the particular group.

At operation 812, a quantity may be estimated for the item. The quantity may represent the optimum quantity. In an example, the quantity computing module may use the price-demand surrogate relationship in an objective function to compute this optimum quantity.

Figure 9:
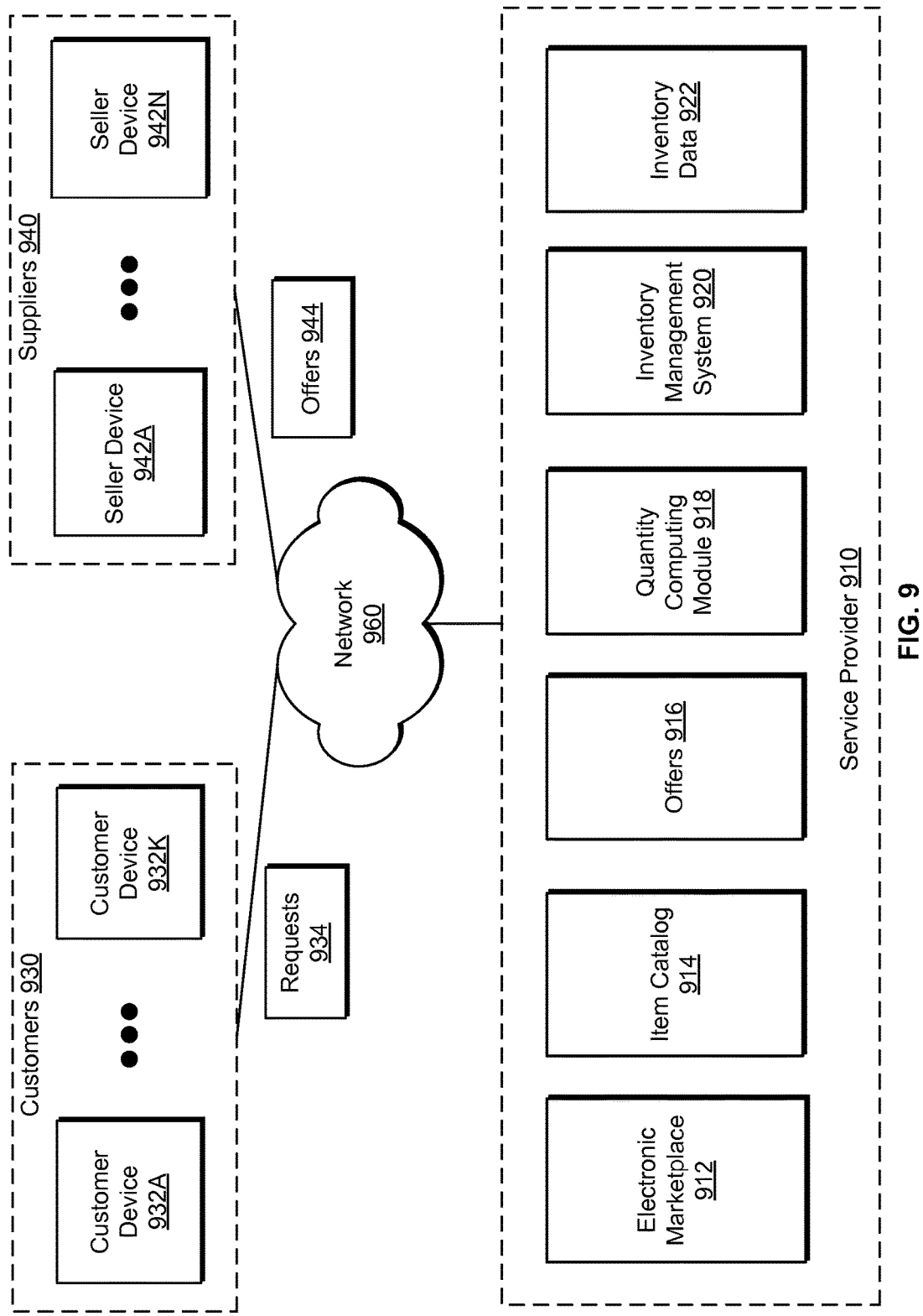
FIG. 9 illustrates an example computing environment associated with an electronic marketplace, according to embodiments.
Figure 10:
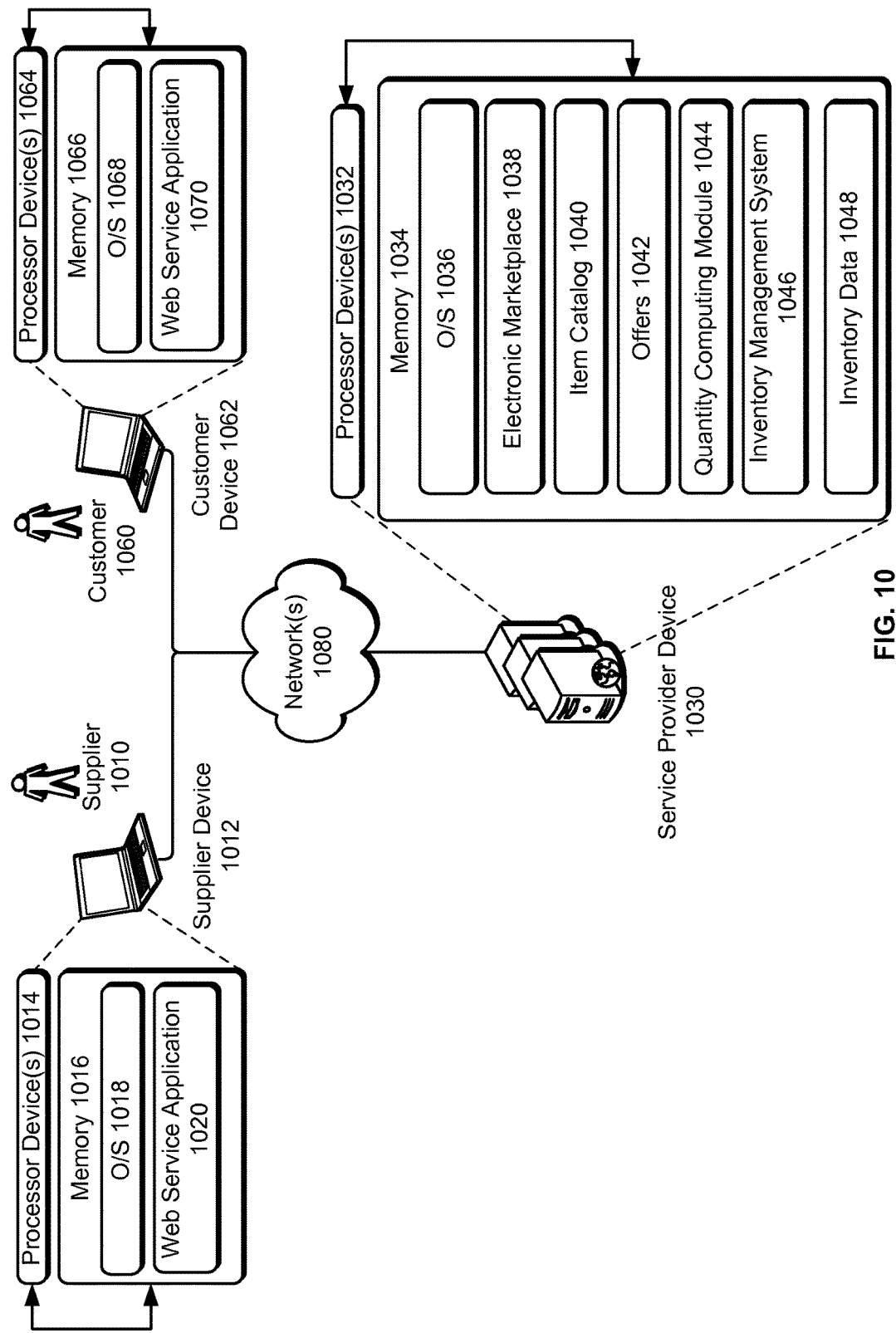
FIG. 10 illustrates an example architecture for providing a network-based resource, including at least one user device and/or one or more service provider devices connected via one or more networks, according to embodiments.

As described herein above, expressing one variable (e.g., a price variable) as a function of another variable (e.g., a demand variable) and using this expression to estimate a third variable (e.g., a quantity) may be applied within the context of an electronic marketplace. The electronic marketplace may represent a computing environment configured to facilitate, in part, transactions between end users. These transactions may be based on the third variable (e.g., whether a sufficient quantity exists in an inventory to inform potential customers that an item may be available from the inventory or not). Given the size and complexity of this computing environment and given the amount and types of data generated as part of facilitating the transactions and/or from the transactions themselves, estimating the different variables may be complex. This complexity may be rooted in the computing environment itself (e.g., due to the size and the complexity of the computing environment and the amount and types of the generated data). Thus, the embodiments described herein in connection with expressing one variable as a function of another variable and using this expression to estimate a third variable may provide an efficient answer to this complexity by allowing, for example, the variables to be accurately estimated. FIGS. 9 and 10 illustrate examples of an electronic marketplace that may implement the various described embodiments.

Turning to FIG. 9, that figure illustrates an example computing environment associated with an electronic marketplace. In particular, a service provider 910 of an electronic marketplace 912 may implement a quantity computing module 918 on a service provider computing resource to enable estimating a quantity of an item for inventorying purposes.

The electronic marketplace 912 may offer different items. Offered items may be cataloged in an item catalog 914. In addition, the offered items may be ordered from the electronic marketplace 912 according to offers 916. The offers 916 may use data from the item catalog 914 to describe some of the item attributes and offer attributes.

A network-based document (e.g., a web page) of the electronic marketplace 912 may be associated with an item. For example, the network-based resource document may allow suppliers 940 and/or the service provider 910 to provide information for ordering an item. This may include the suppliers listing offers 944 at the electronic marketplace 912. The network-based document may also allow customers 930 to review this information and make an order or purchase decision. The customers 930 may, for example submit requests 934 for offers. In an example, the network-based resource document may present information from the item catalog 914 for the offers 916.

The quantity computing module 918 may be configured to use a model implemented to compute the optimum quantity to inventory for each cataloged or offered item. For example, the model may use an objective function to compute the quantity based on maximizing profit given a set of variables. The quantity computing module 918 may also interface or be integrated with an inventory management system 920. The inventory management system 920 may be managed by the service provider 910 and configured to generate inventory plans based on quantities computed by and outputted from the quantity computing module 918. Both of the quantity computing module 918 and the inventory management system 920 may access and use inventory data 922 to perform various operations associated with computing the optimum quantities and generating the inventory plans. The inventory data 922 may represent data generated from transactions associated with the suppliers 940 (e.g., the offers 944) and with the customers 930 (e.g., the requests 934).

As such, the service provider 910 may operate the electronic marketplace 912 to facilitate interactions between the service provider 910, the customers 930, and the suppliers 940 over a network 960. Each one of the suppliers 940 may operate one or more supplier devices 942A-N to access the electronic marketplace 912 and perform various supplier-related transactions. A customer may be an item recipient, a buyer, or any user reviewing, browsing, ordering, obtaining, purchasing, or returning an item of a supplier. Each one of the customers 930 may operate one or more customer devices 932A-K to access the electronic marketplace 912 and perform various customer-related transactions.

Turning to FIG. 10, that figure illustrates an example end-to-end computing environment for implementing a quantity computing module. In this example, a service provider may implement a quantity computing module, such as the quantity computing module 918 of FIG. 9, within the context of, for example, an electronic marketplace available to users, such as the customers 930 and the suppliers 940 of FIG. 9.

In a basic configuration, a supplier 1010 may utilize a supplier device 1012 to access local applications, a web service application 1020, a supplier account accessible through the web service application 1020, a web site or any other network-based resources via one or more networks 1080. In some aspects, the web service application 1020, the web site, and/or the supplier account may be hosted, managed, and/or otherwise provided by one or more computing resources of the service provider, such as by utilizing one or more service provider devices 1030. The supplier 1010 may use the local applications and/or the web service application 1020 to interact with the network-based resources of the service provider and perform supplier-related transactions. These transactions may include, for example, offering items for sale and/or requesting estimates of optimum quantities for items to inventory.

In some examples, the supplier device 1012 may be any type of computing devices such as, but not limited to, a mobile phone, a smart phone, a personal digital assistant (PDA), a laptop computer, a thin-client device, a tablet PC, etc. In one illustrative configuration, the supplier device 1012 may contain communications connection(s) that allow the supplier device 1012 to communicate with a stored database, another computing device or server, supplier terminals, and/or other devices on the networks 1080. The supplier device 1012 may also include input/output (I/O) device(s) and/or ports, such as for enabling connection with a keyboard, a mouse, a pen, a voice input device, a touch input device, a display, speakers, a printer, etc.

The supplier device 1012 may also include at least one or more processing units (or processor device(s)) 1014 and one memory 1016. The processor device(s) 1014 may be implemented as appropriate in hardware, computer-executable instructions, firmware, or combinations thereof. Computer-executable instructions or firmware implementations of the processor device(s) 1014 may include computer-executable or machine-executable instructions written in any suitable programming language to perform the various functions described.

The memory 1016 may store program instructions that are loadable and executable on the processor device(s) 1014, as well as data generated during the execution of these programs. Depending on the configuration and type of supplier device 1012, the memory 1016 may be volatile (such as random access memory (RAM)) and/or non-volatile (such as read-only memory (ROM), flash memory, etc.). The supplier device 1012 may also include additional storage, which may include removable storage and/or non-removable storage. The additional storage may include, but is not limited to, magnetic storage, optical disks, and/or tape storage. The disk drives and their associated computer-readable media may provide non-volatile storage of computer-readable instructions, data structures, program modules, and other data for the computing devices. In some implementations, the memory 1016 may include multiple different types of memory, such as static random access memory (SRAM), dynamic random access memory (DRAM), or ROM.

Turning to the contents of the memory 1016 in more detail, the memory may include an operating system (O/S) 1018 and the one or more application programs or services for implementing the features disclosed herein including the web service application 1020. In some examples, the supplier device 1012 may be in communication with the service provider devices 1030 via the networks 1080, or via other network connections. The networks 1080 may include any one or a combination of many different types of networks, such as cable networks, the Internet, wireless networks, cellular networks, and other private and/or public networks. While the illustrated example represents the supplier 1010 accessing the web service application 1020 over the networks 1080, the described techniques may equally apply in instances where the supplier 1010 interacts with the service provider devices 1030 via the supplier device 1012 over a landline phone, via a kiosk, or in any other manner. It is also noted that the described techniques may apply in other client/server arrangements (e.g., set-top boxes, etc.), as well as in non-client/server arrangements (e.g., locally stored applications, peer-to-peer systems, etc.).

Similarly, a customer 1060 may utilize customer device 1062 to access local applications, a web service application 1070, a customer account accessible through the web service application 1070, a web site, or any other network-based resources via the networks 1080. In some aspects, the web service application 1070, the web site, and/or the user account may be hosted, managed, and/or otherwise provided by the service provider devices 1030 and may be similar to the web service application 1020, the web site accessed by the computing device 1012, and/or the supplier account, respectively.

The customer 1060 may use the local applications and/or the web service application 1070 to conduct transactions with the network-based resources of the service provider. These transactions may include, for example, searching for items offered by the supplier 1010 at the network-based resources, receiving offers for the items, sorting the offers based on different attributes, ordering items, and other transactions.

In some examples, the customer device 1062 may be configured similarly to the supplier device 1012 and may include at least one or more processing units (or processor device(s)) 1064 and one memory 1066. The processor device(s) 1064 may be implemented as appropriate in hardware, computer-executable instructions, firmware, or combinations thereof similarly to the processor device(s) 1014. Likewise, the memory 1066 may also be configured similarly to the memory 1016 and may store program instructions that are loadable and executable on the processor device(s) 1064, as well as data generated during the execution of these programs. For example, the memory 1066 may include an operating system (O/S) 1068 and the one or more application programs or services for implementing the features disclosed herein including the web service application 1070.

As described briefly above, the web service applications 1020 and 1070 may allow the supplier 1010 and customer 1060, respectively, to interact with the service provider devices 1030 to conduct transactions involving items. The service provider devices 1030, perhaps arranged in a cluster of servers or as a server farm, may host the web service applications 1020 and 1070. These servers may be configured to host a web site (or combination of web sites) viewable via the computing devices 1012 and 1062. Other server architectures may also be used to host the web service applications 1020 and 1070. The web service applications 1020 and 1070 may be capable of handling requests from many suppliers 1010 and customers 1060, respectively, and serving, in response, various interfaces that may be rendered at the computing devices 1012 and 1062 such as, but not limited to, a web site. The web service applications 1020 and 1070 may interact with any type of web site that supports interaction, including social networking sites, electronic retailers, informational sites, blog sites, search engine sites, news and entertainment sites, and so forth. As discussed above, the described techniques may similarly be implemented outside of the web service applications 1020 and 1070, such as with other applications running on the computing devices 1012 and 1062, respectively.

The service provider devices 1030 may, in some examples, provide network-based resources such as, but not limited to, applications for purchase and/or download, web sites, web hosting, client entities, data storage, data access, management, virtualization, etc. The service provider devices 1030 may also be operable to provide web hosting, computer application development, and/or implementation platforms, or combinations of the foregoing to the supplier 1010 and customer 1060.

The service provider devices 1030 may be any type of computing device such as, but not limited to, a mobile phone, a smart phone, a personal digital assistant (PDA), a laptop computer, a desktop computer, a server computer, a thin-client device, a tablet PC, etc. The service provider devices 1030 may also contain communications connection(s) that allow service provider devices 1030 to communicate with a stored database, other computing devices or servers, supplier terminals, and/or other devices on the network 1080. The service provider devices 1030 may also include input/output (I/O) device(s) and/or ports, such as for enabling connection with a keyboard, a mouse, a pen, a voice input device, a touch input device, a display, speakers, a printer, etc.

Additionally, in some embodiments, the service provider devices 1030 may be executed by one or more virtual machines implemented in a hosted computing environment. The hosted computing environment may include one or more rapidly provisioned and released network-based resources. Such network-based resources may include computing, networking, and/or storage devices. A hosted computing environment may also be referred to as a cloud computing environment. In some examples, the service provider devices 1030 may be in communication with the computing devices 1012 and 1062 via the networks 1080, or via other network connections. The service provider devices 1030 may include one or more servers, perhaps arranged in a cluster, or as individual servers not associated with one another.

In one illustrative configuration, the service provider devices 1030 may include at least one or more processing units (or processor devices(s)) 1032 and one memory 1034. The processor device(s) 1032 may be implemented as appropriate in hardware, computer-executable instructions, firmware, or combinations thereof. Computer-executable instruction or firmware implementations of the processor device(s) 1032 may include computer-executable or machine-executable instructions written in any suitable programming language to perform the various functions described.

The memory 1034 may store program instructions that are loadable and executable on the processor device(s) 1032, as well as data generated during the execution of these programs. Depending on the configuration and type of the service provider devices 1030, the memory 1034 may be volatile (such as random access memory (RAM)) and/or non-volatile (such as read-only memory (ROM), flash memory, etc.). The service provider devices 1030 may also include additional removable storage and/or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some implementations, the memory 1034 may include multiple different types of memory, such as static random access memory (SRAM), dynamic random access memory (DRAM), or ROM.

Additionally, the computer storage media described herein may include computer-readable communication media such as computer-readable instructions, program modules, or other data transmitted within a data signal, such as a carrier wave, or other transmission. Such a transmitted signal may take any of a variety of forms including, but not limited to, electromagnetic, optical, or any combination thereof. However, as used herein, computer-readable media does not include computer-readable communication media.

Turning to the contents of the memory 1034 in more detail, the memory may include an operating system (O/S) 1036, code for an electronic marketplace 1038, data related to an item catalog 1040, data related to available offers 1042, code for a quantity computing module 1044, code for an inventory management system 1046, and inventory data 1048. Although FIG. 10 illustrates the various data as stored in the memory 1034, this data or portion of the data may be additionally or alternatively stored at a storage device remotely accessible to the service provider devices 1030.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein may be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as that included in the phrase "at least one of X, Y, or Z," unless specifically stated otherwise, is otherwise understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z in order for each to be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate, and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:

generating, by a computer system, a model comprising an objective function that outputs an amount of an item to stock over a time period in a storage facility, the item offered as available from an electronic marketplace based at least in part on an availability of the item from the storage facility, the amount based at least in part on a price variable and a demand variable, a realization of the price variable based at least in part on a set of factors associated with offers for the item from the electronic marketplace;

accessing, by the computer system from a database, historical price realizations associated with the price variable for a plurality of items that include the item, the historical price realizations based at least in part on the set of factors and updated in the database by a provider computer, the database updated based at least in part on tracking by the provider computer of inventory levels of the items in the storage facility;

accessing, by the computer system from the database, historical demand realizations associated with the demand variable for the plurality of items, the historical demand realizations updated in the database based at least in part on the tracking by the provider computer;

generating, by the computer system, an expected realization of the price variable as a function of the demand variable based at least in part on the historical price realizations and the historical demand realizations, the function of the demand variable comprising a conditional expectation of the price variable given the demand variable;

providing, by the computer system, the demand variable and the function of the demand variable as inputs to the objective function;

receiving, by the computer system, the amount from the objective function based at least in part on the inputs; and providing, by the computer system, the amount to an inventory management system that manages a flow of the items in and out of the storage facility over the time period based at least in part on an inventory plan, the inventory plan being generated by the inventory management system based at least in part on the amount.

2. The computer-implemented method of claim 1, wherein the set of factors comprises at least one of: price matching, promotions, markdowns, or vendor-associated list prices.

3. The computer-implemented method of claim 1, wherein the objective function optimizes profit given expected realizations of a set of variables that include the demand variable.

4. The computer-implemented method of claim 1, wherein the expected realization of the price variable is generated based at least in part on estimating expected price realizations for the price variable from the expected demand realizations.

5. A non-transitory computer-readable medium comprising instructions that, when executed on a computing device, cause the computing device to perform operations comprising at least:
- accessing historical data associated with realizations of a price variable for a plurality of items, the realizations of the price variable based at least in part on one or more factors associated with offering the plurality of items;
- generating, based at least in part on the historical data and demand data associated with a demand variable, an expected realization of the price variable as a function of the demand variable, the function of the demand variable comprising a conditional expectation of the price variable given the demand variable;
- estimating a quantity of an item from the plurality of items based at least in part on inputting the function of the demand variable to an objective function; and
- generating an inventory plan for the quantity of the item based at least in part on the estimated quantity.

6. The non-transitory computer-readable medium of claim 5, wherein the objective function maximizes a feature based at least in part on realizations of a set of variables.

7. The non-transitory computer-readable medium of claim 5, wherein the quantity is estimated in response to a request for the quantity, wherein the request is received from a computing device of a provider of the item.

8. The non-transitory computer-readable medium of claim 7, the operations further comprising providing, to the provider of the item, an application programming interface method configured to enable the request.

9. The non-transitory computer-readable medium of claim 5, wherein the instructions, when executed on the computing device, cause the computing device to perform further operations comprising at least:
- computing a realization of another variable associated with the item based at least in part on the historical data; and
- using the expected realization to estimate the quantity based at least in part on determining that the realization of the other variable meets a rule specifying a condition for using the expected realization to estimate the quantity.

10. The non-transitory computer-readable medium of claim 5, wherein the expected realization is generated by at least:
- segmenting the plurality of items in item groups based at least in part on one or more attributes associated with the historical data;
- estimating correlations between the price variable and the demand variable based at least in part on the item groups; and
- generating the expected realization based at least in part on an estimated correlation corresponding to an item group to which the item belongs.

11. The non-transitory computer-readable medium of claim 10, wherein the one or more attributes comprise at least one of: price values, price standard deviation, coefficient of price value variation, competition level, profit value, or coefficient of demand value variation.

12. The non-transitory computer-readable medium of claim 10, wherein the instructions, when executed on the computing device, cause the computing device to perform further operations comprising at least:
- using the expected realization to estimate the quantity based at least in part on determining that one or more attributes meet a rule specifying a condition for using the expected realization to estimate the quantity.

13. A system comprising:
- a processor; and
- a memory comprising instructions that, when executed by the processor, cause the system to at least:
  - generate a model configured to provide a quantity associated with an item based at least in part on a first variable and a second variable associated with the item, a realization of the first variable based at least in part on one or more factors associated with a provider of the item;
  - access data associated with historical realizations of the first variable and the second variable for a plurality of items, at least a portion of the historical realizations based at least in part on the one or more influencing factors;
  - generate an expected realization of the first variable for the item as a function of the second variable based at least in part on the data associated with the historical realizations, the function of the second variable comprising a conditional expectation of the first variable given the second variable; and
  - estimate the quantity based at least in part on using the second variable and the function of the second variable in the model.

14. The system of claim 13, wherein the first variable comprises a price variable, wherein the second variable comprises a demand variable, wherein the quantity enables generating a plan to acquire units of the item for inventorying, and wherein the item is offered at an electronic marketplace.

15. The system of claim 13, wherein the conditional expectation comprises a conditional distribution of the first variable based at least in part on a distribution of the second variable, and wherein the quantity is estimated based at least in part on the conditional distribution of the first variable and the distribution of the second variable.

16. The system of claim 13, wherein the expected realization is generated by at least:
- generating a ratio associated with the first variable based at least in part on variations to the first variable observed in the data during a time frame;
- generating a percentile associated with the second variable based at least in part on a cumulative distribution function of the second variable, wherein the cumulative distribution function is generated based at least in part on the data; and
- outputting the expected realization based at least in part on the ratio and the percentile.

17. The system of claim 16, wherein the first variable comprises a price variable, wherein the second variable comprises a demand variable, and wherein the expected realization is generated by further:
- accessing at least one or more of: price ranges, price change frequencies, demand ranges, demand change frequencies, costs, or competition levels associated with the plurality of the items; and analyzing the ratio, the percentile, and the accessed at least one or more of: the price ranges, price change frequencies, demand ranges, demand change frequencies, costs, or competition levels based at least in part on one or more regression models to generate the expected realization.

18. The system of claim 13, wherein the first variable comprises a price variable, and wherein the expected realization is generated by at least:

generating a price ratio associated with the item based at least in part on variations to the price variable observed in the data during a time frame, wherein the price ratio is generated based at least in part on an observed price of the item at a point in time during the time frame and a sales price of the item at another point in time during the time frame; and outputting the expected realization based at least in part on the price ratio of the item and price ratios associated with remaining items of the plurality of items.

19. The system of claim 13, wherein the second variable comprises a demand variable, and wherein the expected realization is generated by at least:

generating a demand percentile associated with the item based at least in part on a cumulative distribution function of the demand variable, the cumulative distribution function generated from realized demands of the item observed in the data; and outputting the expected realization based at least in part on the demand percentile of the item and demand percentiles associated with remaining items of the plurality of items.

20. The system of claim 13, wherein the first variable comprises a price variable, wherein the second variable comprises a demand variable, and wherein the expected realization is generated by at least:

computing price ratios associated with the plurality of items based at least in part on variations to the price variable observed in the data;

computing demand percentiles associated with the plurality of items based at least in part on cumulative distribution functions of the demand variable;

applying regression models to the price ratios and the demand percentiles to generate an estimated function of the price ratios based at least in part on the demand percentiles; and generating the expected realization based at least in part on the estimated function.

* * * * *